US012264232B2

(12) United States Patent
Hue et al.

(10) Patent No.: US 12,264,232 B2
(45) Date of Patent: Apr. 1, 2025

(54) MODIFIED HIGH-CIS POLYBUTADIENE POLYMER, RELATED METHODS AND TIRE COMPONENTS

(71) Applicants: Bridgestone Corporation, Chuo-ku (JP); Bridgestone Americas Tire Operations, LLC, Nashville, TN (US)

(72) Inventors: Ryan J. Hue, Akron, OH (US); Laura S. Kocsis, Akron, OH (US); Terrence E. Hogan, Uniontown, OH (US); Jeffrey A. Cicerchi, Akron, OH (US)

(73) Assignees: Bridgestone Corporation, Chuo-ku (JP); Bridgestone Americas Tire Operations, LLC, Nashville, TN (US)

( * ) Notice: Subject to any disclaimer, the term of this patent is extended or adjusted under 35 U.S.C. 154(b) by 654 days.

(21) Appl. No.: 17/610,902

(22) PCT Filed: May 14, 2020

(86) PCT No.: PCT/US2020/032821
§ 371 (c)(1),
(2) Date: Nov. 12, 2021

(87) PCT Pub. No.: WO2020/232212
PCT Pub. Date: Nov. 19, 2020

(65) Prior Publication Data
US 2022/0213300 A1 Jul. 7, 2022

Related U.S. Application Data

(60) Provisional application No. 62/847,894, filed on May 14, 2019.

(51) Int. Cl.
| | |
|---|---|
| C08L 15/00 | (2006.01) |
| B60C 1/00 | (2006.01) |
| C08C 19/25 | (2006.01) |
| C08F 4/54 | (2006.01) |
| C08F 136/06 | (2006.01) |
| C08K 3/04 | (2006.01) |
| C08K 3/36 | (2006.01) |
| C08K 5/01 | (2006.01) |

(52) U.S. Cl.
CPC ............ *C08L 15/00* (2013.01); *B60C 1/0016* (2013.01); *C08C 19/25* (2013.01); *C08F 4/545* (2013.01); *C08F 136/06* (2013.01); *C08K 3/04* (2013.01); *C08K 3/36* (2013.01); *C08K 5/01* (2013.01); *C08F 2810/40* (2013.01); *C08L 2205/02* (2013.01)

(58) Field of Classification Search
CPC .... C08L 15/00; C08L 2205/02; B60C 1/0016; C08C 19/25; C08F 4/545; C08F 136/06; C08F 2810/40; C08F 8/42; C08K 3/04; C08K 3/36; C08K 5/01
See application file for complete search history.

(56) References Cited

U.S. PATENT DOCUMENTS

| | | | |
|---|---|---|---|
| 4,550,142 A | 10/1985 | Akita et al. | |
| 4,647,625 A | 3/1987 | Aonuma et al. | |
| 4,906,706 A | 3/1990 | Hattori et al. | |
| 4,990,573 A | 2/1991 | Andreussi et al. | |
| 5,064,910 A | 11/1991 | Hattori et al. | |
| 5,153,271 A | 10/1992 | Lawson et al. | |
| 5,567,784 A | 10/1996 | Wieder et al. | |
| 5,844,050 A | 12/1998 | Fukahori et al. | |
| 6,255,404 B1 | 7/2001 | Hogan et al. | |
| 6,759,497 B2 | 7/2004 | Grün et al. | |
| 6,765,066 B2 | 7/2004 | Ozawa et al. | |
| 6,777,026 B2 | 8/2004 | Halladay et al. | |
| 6,977,281 B1 | 12/2005 | Ozawa et al. | |
| 6,992,147 B1 | 1/2006 | Ozawa et al. | |
| 7,030,195 B2 | 4/2006 | Viola et al. | |
| 7,202,306 B2 | 4/2007 | Tanaka et al. | |
| 7,288,594 B2 | 10/2007 | Ozawa et al. | |
| 7,867,960 B2 | 1/2011 | Yamaguchi et al. | |
| 7,968,652 B2 | 6/2011 | Kurazumi et al. | |
| 8,153,566 B2 | 4/2012 | Yamaguchi et al. | |
| 8,258,241 B2 | 9/2012 | Tanaka et al. | |
| 8,421,247 B2 | 4/2013 | Hayashi et al. | |
| 8,674,030 B2 | 3/2014 | Lee et al. | |
| 8,729,167 B2 | 5/2014 | Thiele et al. | |
| 8,846,837 B2 | 9/2014 | Kloppenburg et al. | |

(Continued)

FOREIGN PATENT DOCUMENTS

| | | |
|---|---|---|
| CN | 105732689 A | 7/2016 |
| EP | 2098554 A1 | 9/2009 |

(Continued)

OTHER PUBLICATIONS

International search report from application No. PCT/US2020/031874, mailed Aug. 18, 2020.
PCT written opinion from application No. PCT/US2020/031874, mailed Aug. 18, 2020.
Extended European search report from application EP20802619, dated Jan. 31, 2023.
International search report from application No. PCT/US2020/032821, mailed Aug. 24, 2020.
PCT International Preliminary Report on Patentability and Written Opinion from application No. PCT/US2020/032821, mailed Nov. 16, 2021.
Extended European search report from application EP20806842.9, dated Jan. 24, 2023.

(Continued)

*Primary Examiner* — Doris L Lee
(74) *Attorney, Agent, or Firm* — Meredith E. Hooker; Jenny L. Sheaffer

(57) ABSTRACT

Disclosed herein area process for preparing a modified high-cis polybutadiene polymer, a modified high-cis polybutadiene polymer, and tires having a component made using the modified high-cis polybutadiene polymer. The processes make use of a functionalizing compound of formula (I) to prepare the modified high-cis polybutadiene from a quantity of 1,3-butadiene monomer using a specified catalyst system.

16 Claims, No Drawings

(56) References Cited

U.S. PATENT DOCUMENTS

| | | |
|---|---|---|
| 8,877,857 B2 | 11/2014 | Tokimune et al. |
| 9,212,276 B2 | 12/2015 | Tanaka et al. |
| 9,260,593 B2 | 2/2016 | Hsieh et al. |
| 9,556,297 B2 | 1/2017 | Qin et al. |
| 9,587,059 B2 | 3/2017 | Steinauser |
| 9,623,705 B2 | 4/2017 | Tanaka et al. |
| 2001/0049023 A1 | 12/2001 | Havey et al. |
| 2003/0069365 A1 | 4/2003 | Grun et al. |
| 2004/0254301 A1 | 12/2004 | Tsukimawashi et al. |
| 2006/0004131 A1 | 1/2006 | Ozawa et al. |
| 2008/0182954 A1 | 7/2008 | Luo et al. |
| 2010/0099795 A1 | 4/2010 | Uesaka |
| 2010/0317794 A1* | 12/2010 | Tanaka .............. C08C 19/44 525/331.3 |
| 2011/0245398 A1 | 10/2011 | Hama et al. |
| 2011/0319519 A1 | 12/2011 | Sone et al. |
| 2013/0023624 A1 | 1/2013 | Sekikawa et al. |
| 2014/0031471 A1 | 1/2014 | Rademacher et al. |
| 2014/0121316 A1 | 5/2014 | Monsallier et al. |
| 2015/0166738 A1 | 6/2015 | DeDecker et al. |
| 2015/0240016 A1 | 8/2015 | Pawlow et al. |
| 2015/0329716 A1 | 11/2015 | Kojima et al. |
| 2016/0096909 A1 | 4/2016 | Sekikawa et al. |
| 2016/0319045 A1 | 11/2016 | Dire et al. |
| 2016/0362504 A1 | 12/2016 | Dire et al. |
| 2017/0275390 A1 | 9/2017 | Bae et al. |
| 2018/0030070 A1 | 2/2018 | Rossle et al. |
| 2018/0030248 A1 | 2/2018 | Hatano et al. |
| 2019/0048115 A1 | 2/2019 | Lee et al. |
| 2020/0172639 A1 | 6/2020 | Hogan et al. |
| 2021/0198386 A1 | 7/2021 | Valutier et al. |
| 2022/0144974 A1 | 5/2022 | Cicerchi et al. |

FOREIGN PATENT DOCUMENTS

| | | | |
|---|---|---|---|
| EP | 2193938 A1 | 6/2010 | |
| EP | 2952525 A1 | 12/2015 | |
| EP | 3199572 A1 | 8/2017 | |
| JP | 2001-139633 A | 5/2001 | |
| JP | 2005-232364 A | 9/2005 | |
| JP | 2010-185053 A | 8/2010 | |
| JP | 2010-260919 A | 11/2010 | |
| JP | 2010-270175 A | 12/2010 | |
| JP | 2011-093989 A | 5/2011 | |
| JP | 2013-127064 A | 6/2013 | |
| JP | 2014-501327 A | 1/2014 | |
| JP | 2020-504205 A | 2/2020 | |
| KR | 10-1778777 B1 | 9/2017 | |
| WO | 2010-116988 A1 | 10/2010 | |
| WO | 2013-127448 A1 | 9/2013 | |
| WO | 2020-232212 A1 | 11/2020 | |
| WO | WO-2020227531 A1 * | 11/2020 | ........... B60C 1/0016 |

OTHER PUBLICATIONS

Zhiquan, Shen., et al., "The Characteristics of Lanthanide Coordination Catalyst and the cis-Polydienes Prepared Therewith," Journal of Polymer Science: Polymer Chemistry Edition, vol. 18 (1980), pp. 3345-3357.

Hsieh, H.L. et al., "Polymerization of Butadiene and Isoprene With Lanthanide Catalysts; Characterization and Properties of Homopolymers and Copolymers," Rubber Chemistry and Technology, vol. 58 (1985), pp. 117-145.

Wilson, D.J., Journal of Polymer Science, Part A, Polymer Chemistry, "A Nd-carboxylate Catalyst for the Polymerization of 1,3-butadiene: The Effect of Alkylaluminums and Alkylaluminum Chlorides," vol. 33 (1995), pp. 2505-2513.

* cited by examiner

MODIFIED HIGH-CIS POLYBUTADIENE POLYMER, RELATED METHODS AND TIRE COMPONENTS

This application is a national stage application of PCT/US2020/032821 filed on May 14, 2020, which claims the benefit of U.S. Provisional Application Ser. No. 62/847,894 filed on May 14, 2019, all of which are incorporated herein by reference in their entirety.

FIELD

The present application is directed to a modified high-cis polybutadiene polymer, related methods and tires having a component incorporating the modified high-cis polybutadiene polymer.

BACKGROUND

High-cis polybutadiene polymers have numerous uses in industry, including use in tire rubber compositions for use in tire components such as tire treads. Modification of such high-cis polybutadiene polymers by certain functionalizing compounds to increase filler-polymer interactions may lead to a polymer with a desirable initial Mooney viscosity, but such polymers may be prone to Mooney viscosity growth upon aging creating challenges with storage of the modified polymer.

SUMMARY

Disclosed herein are a modified high-cis polybutadiene polymer, processes for preparing the modified high-cis polybutadiene polymer, and tires having a component made from a rubber composition containing the modified high-cis polybutadiene polymer.

In a first embodiment, a process is provided for preparing a modified high-cis polybutadiene polymer. According to the first embodiment, the process comprises: (A) providing a catalyst system comprising (a) a lanthanide-based catalyst system comprising (i) a lanthanide compound, (ii) an alkylating agent, and (iii) a halogen source, where (iii) may optionally be provided by (i), (ii), or both (i) and (ii); (b) a nickel-based catalyst system comprising (i) a nickel compound, optionally in combination with an alcohol, (ii) an organoaluminum, organomagnesium, organozinc compound, or a combination thereof, and (iii) a fluorine-containing compound or a complex thereof; or (c) a cobalt-based catalyst system, comprising (i) a cobalt compound, (ii) an organo aluminum halide, and (iii) optionally water; (B) using the catalyst system of (A) to polymerize 1,3-butadiene to produce polymer chains with a living end, (C) reacting the living end polymer chains from (B) with a functionalizing compound having formula (I) as follows

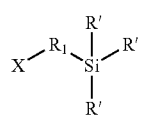

where X is a cyano group, $R^1$ is independently selected from hydrocarbylene of $C_1$-$C_{20}$, each R' is independently selected from alkoxy of $C_1$-$C_{20}$, thereby producing a modified high-cis polybutadiene having a cis 1,4-bond content of at least 92%, (D) reacting the modified high-cis polybutadiene from (C) with (1) a stabilizing agent of formula (II) as follows:

$$R^2{}_n Si(OR^3)_{4-n}$$

wherein $R^2$ is selected from the group consisting of $C_1$ to $C_{20}$ alkyl, $C_4$ to $C_{10}$ cycloalkyl, or $C_5$ to $C_{20}$ aromatic groups; wherein $R^3$ may be the same as or different from $R^2$ and is selected from $C_1$ to $C_{20}$ alkyl, $C_4$ to $C_{10}$ cycloalkyl, or $C_5$ to $C_{20}$ aromatic groups; and n is an integer of 1 to 3, and (2) a quenching agent of formula (III) as follows $$R^4 COOH$$

wherein $R^4$ is selected from H and the group consisting of $C_1$ to $C_{18}$ alkyl; and (E) isolating the modified high-cis polybutadiene of (D), to produce a final modified high-cis polybutadiene having, an initial Mooney viscosity $ML_{1+4}$ at 100° C. of 20-100, and an aged Mooney viscosity $ML_{1+4}$ at 100 C that is no more than 120.

In a second embodiment, a modified high-cis polybutadiene polymer is provided. According to the second embodiment, a modified high-cis polybutadiene polymer is provided which has polymer chains bonded to a residue of a functionalizing compound having formula (I) as follows

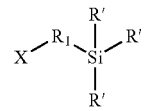

where X is a cyano group, $R^1$ is independently selected from hydrocarbylene of $C_1$-$C_{20}$, each R' is independently selected from alkoxy of $C_1$-$C_{20}$, and wherein each polymer chain is bonded to the residue of the functionalizing compound through the X group, and the polymer has an initial Mooney viscosity $ML_{1+4}$ at 100° C. of 20-100, and an aged Mooney viscosity $ML_{1+4}$ at 100° C. of no more than 120.

In a third embodiment, a tire having a component comprising a rubber composition including the high-cis modified polybutadiene of the second embodiment or a high-cis modified polybutadiene made by the process of the first embodiment is provided. According to the third embodiment, the component of the tire comprises a rubber composition comprising (a) an elastomer component comprising: (i) 10-100 phr of a high-cis modified polybutadiene polymer according to the second embodiment or the high-cis modified polybutadiene polymer resulting from the process of the first embodiment, and (ii) 0-90 phr of at least one additional polymer selected from the group consisting of unmodified polybutadiene, styrene-butadiene, natural rubber, polyisoprene; (b) a reinforcing filler component comprising: (i) 10-200 phr of reinforcing silica filler, and (ii) 0-50 phr of reinforcing carbon black filler, wherein the reinforcing carbon black filler is present in an amount of no more than 20% of the weight of reinforcing silica filler; (c) a plasticizing component comprising: (i) 0-50 phr of at least one plasticizing oil, and (ii) 0-60 phr of at least one hydrocarbon resin having a Tg of at least 30° C.; and (d) a cure package.

DETAILED DESCRIPTION

Disclosed herein are a modified high-cis polybutadiene polymer, processes for preparing the modified high-cis polybutadiene polymer, and tires having a component made from a rubber composition containing the modified high-cis polybutadiene polymer.

In a first embodiment, a process is provided for preparing a modified high-cis polybutadiene polymer. According to the first embodiment, the process comprises: (A) providing a catalyst system comprising (a) a lanthanide-based catalyst system comprising (i) a lanthanide compound, (ii) an alkylating agent, and (iii) a halogen source, where (iii) may optionally be provided by (i), (ii), or both (i) and (ii); (b) a nickel-based catalyst system comprising (i) a nickel compound, optionally in combination with an alcohol, (ii) an organoaluminum, organomagnesium, organozinc compound, or a combination thereof, and (iii) a fluorine-containing compound or a complex thereof; or (c) a cobalt-based catalyst system, comprising (i) a cobalt compound, (ii) an organo aluminum halide, and (iii) optionally water; (B) using the catalyst system of (A) to polymerize 1,3-butadiene to produce polymer chains with a living end, (C) reacting the living end polymer chains from (B) with a functionalizing compound having formula (I) as follows

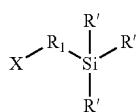

where X is a cyano group, $R^1$ is independently selected from hydrocarbylene of $C_1$-$C_{20}$, each R' is independently selected from alkoxy of $C_1$-$C_{20}$, thereby producing a modified high-cis polybutadiene having a cis 1,4-bond content of at least 92%, (D) reacting the modified high-cis polybutadiene from (C) with (1) a stabilizing agent of formula (II) as follows:

$$R^2{}_nSi(OR^3)_{4-n}$$

wherein $R^2$ is selected from the group consisting of $C_1$ to $C_{20}$ alkyl, $C_4$ to $C_{10}$ cycloalkyl, or $C_5$ to $C_{20}$ aromatic groups; wherein $R^3$ may be the same as or different from $R^2$ and is selected from $C_1$ to $C_{20}$ alkyl, $C_4$ to $C_{10}$ cycloalkyl, or $C_5$ to $C_{20}$ aromatic groups; and n is an integer of 1 to 3, and (2) a quenching agent of formula (III) as follows $$R^4COOH$$

wherein $R^4$ is selected from H and the group consisting of $C_1$ to $C_{18}$ alkyl; and (E) isolating the modified high-cis polybutadiene of (D), to produce a final modified high-cis polybutadiene having, an initial Mooney viscosity $ML_{1+4}$ at 100° C. of 20-100, and an aged Mooney viscosity $ML_{1+4}$ at 100 C that is no more than 120.

In a second embodiment, a modified high-cis polybutadiene polymer is provided. According to the second embodiment, a modified high-cis polybutadiene polymer is provided which has polymer chains bonded to a residue of a functionalizing compound having formula (I) as follows

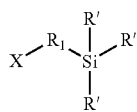

where X is a cyano group, $R^1$ is independently selected from hydrocarbylene of $C_1$-$C_{20}$, each R' is independently selected from alkoxy of $C_1$-$C_{20}$, and wherein each polymer chain is bonded to the residue of the functionalizing compound through the X group, and the polymer has an initial Mooney viscosity $ML_{1+4}$ at 100° C. of 20-100, and an aged Mooney viscosity $ML_{1+4}$ at 100° C. of no more than 120.

In a third embodiment, a tire having a component comprising a rubber composition including the high-cis modified polybutadiene of the second embodiment or a high-cis modified polybutadiene made by the process of the first embodiment is provided. According to the third embodiment, the component of the tire comprises a rubber composition comprising (a) an elastomer component comprising: (i) 10-100 phr of a high-cis modified polybutadiene polymer according to the second embodiment or the high-cis modified polybutadiene polymer resulting from the process of the first embodiment, and (ii) 0-90 phr of at least one additional polymer selected from the group consisting of unmodified polybutadiene, styrene-butadiene, natural rubber, polyisoprene; (b) a reinforcing filler component comprising: (i) 10-200 phr of reinforcing silica filler, and (ii) 0-50 phr of reinforcing carbon black filler, wherein the reinforcing carbon black filler is present in an amount of no more than 20% of the weight of reinforcing silica filler; (c) a plasticizing component comprising: (i) 0-50 phr of at least one plasticizing oil, and (ii) 0-60 phr of at least one hydrocarbon resin having a Tg of at least 30° C.; and (d) a cure package.

Definitions

The terminology as set forth herein is for description of the embodiments only and should not be construed as limiting the invention as a whole.

As used herein, the term "living end" (e.g., living end of a polymer chain) is used to refer to a polymer species having a living end that has not yet been terminated; the living end is capable of reacting with a functionalizing compound and, thus, can be described as reactive.

As used herein, the abbreviation Mn is used for number average molecular weight.

As used herein, the abbreviation Mw is used for weight average molecular weight.

Unless otherwise indicated herein, the term "Mooney viscosity" refers to the Mooney viscosity, $ML_{1+4}$. As those of skill in the art will understand, a rubber's Mooney viscosity is measured prior to vulcanization or curing.

As used herein, the term "natural rubber" means naturally occurring rubber such as can be harvested from sources such as Hevea rubber trees and non-Hevea sources (e.g., guayule shrubs and dandelions such as TKS). In other words, the term "natural rubber" should be construed so as to exclude synthetic polyisoprene.

As used herein, the term "phr" means parts per one hundred parts rubber. The one hundred parts rubber may also be referred to herein as 100 parts of an elastomer component.

As used herein the term "polyisoprene" means synthetic polyisoprene. In other words, the term is used to indicate a polymer that is manufactured from isoprene monomers, and should not be construed as including naturally occurring rubber (e.g., Hevea natural rubber, guayule-sourced natural rubber, or dandelion-sourced natural rubber). However, the term polyisoprene should be construed as including polyisoprenes manufactured from natural sources of isoprene monomer.

As used herein, the term "tread," refers to both the portion of a tire that comes into contact with the road under normal inflation and load as well as any subtread.

Processes for Preparing a Modified High-Cis Polybutadiene Polymer

Generally, the process of the first embodiment described herein can be considered to be a solution polymerization processes. In this type of polymerization process, the polymerization reaction takes place in organic solvent-based solution. Here, that organic solvent-based solution initially contains a quantity of conjugated diene monomer and one of the specified catalyst systems. Generally, according to the processes of the first embodiment, the organic solvent-based solution comprises 20-90% by weight (wt %) organic solvent based on the total weight of the monomer, organic solvent, and polybutadiene in the solution. Preferably, the organic solvent comprises the predominant component of the solution, i.e., 50-90 wt % organic solvent, and more preferably 70 wt % to 90 wt % organic solvent based on the total weight of the monomer, organic solvent, and polybutadiene. The solution polymerization processes disclosed herein can be contrasted with gas-type or bulk-type polymerizations, where polymerization is carried out in the absence of any organic solvent or where there is less than 20 wt % organic solvent present based on the total weight of the monomer, organic solvent, and polybutadiene.

Suitable organic solvents for use in solution polymerization processes according to the first embodiment described herein are those solvents that are inert to the polymerization reaction such that the solvent is not a reactant in the polymerization reaction. Suitable organic solvents include aromatic hydrocarbons, aliphatic hydrocarbons, and cycloaliphatic hydrocarbons. Examples of suitable aromatic hydrocarbon solvents include, but are not limited to benzene, toluene, ethylbenzene, diethylbenzene, naphthalenes, mesitylene, xylenes, and the like. Examples of suitable aliphatic hydrocarbon solvents include, but are not limited to, n-pentane, n-hexane, n-heptane, n-octane, n-nonane, n-decane, isopentane, hexanes, isohexanes, isopentanes, isooctanes, 2,2-dimethylbutane, petroleum ether, kerosene, petroleum spirits, and the like. Non-limiting examples of suitable cycloaliphatic hydrocarbon solvents include cyclopentane, cyclohexane, methylcyclopentane, methylcyclohexane, and the like. Mixtures of the foregoing aromatic hydrocarbon solvents, aliphatic hydrocarbon solvents, and cycloaliphatic hydrocarbon solvents can also be used. In certain embodiments of the first embodiment, the preferred organic solvent includes an aliphatic hydrocarbon solvent, a cycloaliphatic hydrocarbon solvent, or mixtures thereof. Additional useful organic solvents suitable for use in the processes of the first embodiment are known to those skilled in the art.

Solution polymerization processes according to the first embodiment disclosed herein are preferably conducted under anaerobic conditions under a blanket of inert gas, such as nitrogen, argon, or helium. The polymerization temperature may vary widely, ranging from −50° C. to 150° C., with the preferred temperature range being 50° C. to 120° C. The polymerization pressure may also vary widely, ranging from 1 atmosphere (atm) to 30 atm, preferably 1 atm to 10 atm (e.g., 1, 2, 3, 4, 5, 6, 7, 8, 9, or 10 atm).

A solution polymerization process according to the first embodiment disclosed herein may be conducted as a continuous, a semi-continuous, or a batch process. In a semi-continuous process, the monomer is intermittingly charged to replace the monomer that has already polymerized. The polymerization of 1,3-butadiene monomer into a high-cis polybutadiene in accordance with the processes described herein occurs when the monomer and the lanthanide-based catalyst system (or other catalyst system, as described herein) are all present in the organic solvent-based solution. The order of addition of the monomer and catalyst to the organic solvent does not matter.

Generally, the polymerization process of the first embodiment as disclosed herein can be stopped by adding any suitable terminating agent. Non-limiting examples of suitable terminating agents include protic compounds, such as alcohols, carboxylic acids, inorganic acids, water, and mixtures thereof. Other suitable terminating agents are known to those skilled in the art. Furthermore, once the polymerization has been stopped, the resulting high-cis polydiene can be recovered (or isolated) from the solution using conventional methods, e.g., steam desolventization or steam distillation, coagulation with an alcohol, filtration, purification, drying, etc., known to those skilled in the art. In preferred embodiments of the first embodiment, the high-cis polybutadiene polymer is isolated by the use of steam distillation.

Catalyst Systems

As mentioned above, according to the process of the first embodiment, the catalyst system is selected from one of (a) a lanthanide-based catalyst system, (b) a nickel-based catalyst system, or (c) a cobalt-based catalyst system. Preferably, a lanthanide-based catalyst system is used. Use of one of the specified catalyst systems in the process of the first embodiment provides advantages in modifying the living end of the polymer chains with a functionalizing compound, as discussed further infra. According to the process of the first embodiment, the catalyst system that is used avoids the use of anionic initiator (e.g., an organolithium compound such as n-butyl lithium).

Lanthanide-Based Catalyst System

As mentioned above, the process of the first embodiment may utilize a lanthanide-based catalyst system which comprises: (i) a lanthanide compound, (ii) an alkylating agent, and (iii) a halogen source, where (iii) may optionally be provided by (i), (ii), or both (i) and (ii). The lanthanide-based catalyst system is used to polymerize a quantity of conjugated diene monomer (discussed in more detail below) to produce polymer chains with a living end. Preferably according to the process of the first embodiment, the lanthanide-based catalyst system is pre-formed before being added to any solution of the conjugated diene monomer.

As mentioned above, the lanthanide-based catalyst system employed in the processes of the first embodiment includes a lanthanide compound. Lanthanide compounds useful in the processes of the first embodiment are those compounds that include at least one atom of a lanthanide element. As used herein, "lanthanide element" refers to the elements found in the lanthanide series of the Periodic Table (i.e., element numbers 57-71) as well as didymium, which is a mixture of rare-earth elements obtained from monazite sand. In particular, the lanthanide elements as disclosed herein include lanthanum, neodymium, cerium, praseodymium, promethium, samarium, europium, gadolinium, terbium, dysprosium, holmium, erbium, thulium, ytterbium, lutetium, and didymium. Preferably, the lanthanide compound includes at least one atom of neodymium, gadolinium, samarium, or combinations thereof. Most preferably, the lanthanide compound includes at least one atom of neodymium.

The lanthanide atom in the lanthanide compound can be in various oxidation states including, but not limited to, the 0, +2, +3, and +4 oxidation states. In accordance with certain embodiments of the processes of the first embodiment, a trivalent lanthanide compound, where the lanthanide atom is in the +3 oxidation state, is used. Generally, suitable lanthanide compounds for use in the processes of the first embodiment include, but are not limited to, lanthanide carboxylates, lanthanide organophosphates, lanthanide organophosphonates, lanthanide organophosphinates, lanthanide carbamates, lanthanide dithiocarbamates, lanthanide xanthates, lanthanide β-diketonates, lanthanide alkoxides or aryloxides, lanthanide halides, lanthanide pseudo-halides, lanthanide oxyhalides, and organolanthanide compounds. Preferably, the lanthanide compound is a lanthanide carboxylate, more preferably a neodymium carboxylate and most preferably neodymium versatate.

In accordance with certain embodiments of the processes of the first embodiment, the lanthanide compound(s) may be soluble in hydrocarbon solvents such as the aromatic hydrocarbon solvents, aliphatic hydrocarbon solvents, or cycloaliphatic hydrocarbon solvents disclosed herein. Hydrocarbon-insoluble lanthanide compounds, however, can also be useful in the process of the first embodiment, as they can be suspended in the polymerization medium to form the catalytically active species.

For ease of illustration, further discussion of useful lanthanide compounds for use in the processes of the first embodiment will focus on neodymium compounds, although those skilled in the art will be able to select similar compounds that are based upon the other lanthanide metals disclosed herein.

Examples of suitable neodymium carboxylates for use as the lanthanide compound in the processes of the first embodiment include, but are not limited to, neodymium formate, neodymium acetate, neodymium acrylate, neodymium methacrylate, neodymium valerate, neodymium gluconate, neodymium citrate, neodymium fumarate, neodymium lactate, neodymium maleate, neodymium oxalate, neodymium 2-ethylhexanoate, neodymium neodecanoate (i.e., neodymium versatate or $NdV_3$), neodymium naphthenate, neodymium stearate, neodymium oleate, neodymium benzoate, and neodymium picolinate.

Examples of suitable neodymium organophosphates for use as the lanthanide compound in the processes of the first embodiment include, but are not limited to, neodymium dibutyl phosphate, neodymium dipentyl phosphate, neodymium dihexyl phosphate, neodymium diheptyl phosphate, neodymium dioctyl phosphate, neodymium bis(1-methylheptyl)phosphate, neodymium bis(2-ethylhexyl)phosphate, neodymium didecyl phosphate, neodymium didodecyl phosphate, neodymium dioctadecyl phosphate, neodymium dioleyl phosphate, neodymium diphenyl phosphate, neodymium bis(p-nonylphenyl)phosphate, neodymium butyl (2-ethylhexyl)phosphate, neodymium (1-methylheptyl) (2-ethylhexyl)phosphate, and neodymium (2-ethylhexyl) (p-nonylphenyl)phosphate.

Examples of suitable neodymium organophosphonates for use as the lanthanide compound in processes of the first embodiment include, but are not limited to, neodymium butyl phosphonate, neodymium pentyl phosphonate, neodymium hexyl phosphonate, neodymium heptyl phosphonate, neodymium octyl phosphonate, neodymium (1-methylheptyl)phosphonate, neodymium (2-ethylhexyl)phosphonate, neodymium decyl phosphonate, neodymium dodecyl phosphonate, neodymium octadecyl phosphonate, neodymium oleyl phosphonate, neodymium phenyl phosphonate, neodymium (p-nonylphenyl)phosphonate, neodymium butyl butylphosphonate, neodymium pentyl pentylphosphonate, neodymium hexyl hexylphosphonate, neodymium heptyl heptylphosphonate, neodymium octyl octylphosphonate, neodymium (1-methylheptyl) (1-methylheptyl)phosphonate, neodymium (2-ethylhexyl) (2-ethylhexyl)phosphonate, neodymium decyl decylphosphonate, neodymium dodecyl dodecylphosphonate, neodymium octadecyl octadecylphosphonate, neodymium oleyl oleylphosphonate, neodymium phenyl phenylphosphonate, neodymium (p-nonylphenyl) (p-nonylphenyl)phosphonate, neodymium butyl (2-ethylhexyl)phosphonate, neodymium (2-ethylhexyl)butylphosphonate, neodymium (1-methylheptyl) (2-ethylhexyl)phosphonate, neodymium (2-ethylhexyl) (1-methylheptyl)phosphonate, neodymium (2-ethylhexyl) (p-nonylphenyl)phosphonate, and neodymium (p-nonylphenyl) (2-ethylhexyl)phosphonate.

Examples of suitable neodymium organophosphinates for use as the lanthanide compound in the processes of the first embodiment include, but are not limited to, neodymium butylphosphinate, neodymium pentylphosphinate, neodymium hexylphosphinate, neodymium heptylphosphinate, neodymium octylphosphinate, neodymium (1-methylheptyl)phosphinate, neodymium (2-ethylhexyl)phosphinate, neodymium decylphosphinate, neodymium dodecylphosphinate, neodymium octadecylphosphinate, neodymium oleylphosphinate, neodymium phenylphosphinate, neodymium (p-nonylphenyl)phosphinate, neodymium dibutylphosphinate, neodymium dipentylphosphinate, neodymium dihexylphosphinate, neodymium diheptylphosphinate, neodymium dioctylphosphinate, neodymium bis(1-methylheptyl)phosphinate, neodymium bis(2-ethylhexyl)phosphinate, neodymium didecylphosphinate, neodymium didodecylphosphinate, neodymium dioctadecylphosphinate, neodymium dioleylphosphinate, neodymium diphenylphosphinate, neodymium bis(p-nonylphenyl)phosphinate, neodymium butyl (2-ethylhexyl)phosphinate, neodymium (1-methylheptyl)(2-ethylhexyl)phosphinate, and neodymium (2-ethylhexyl)(p-nonylphenyl)phosphinate.

Examples of suitable neodymium carbamates for use as the lanthanide compound in the processes of the first embodiment include, but are not limited to, neodymium dimethylcarbamate, neodymium diethylcarbamate, neodymium diisopropylcarbamate, neodymium dibutylcarbamate, and neodymium dibenzylcarbamate.

Examples of suitable neodymium dithiocarbamates for use as the lanthanide compound in the processes of the first embodiment include, but are not limited to, neodymium dimethyldithiocarbamate, neodymium diethyldithiocarbamate, neodymium diisopropyldithiocarbamate, neodymium dibutyldithiocarbamate, and neodymium dibenzyldithiocarbamate.

Examples of suitable neodymium xanthates for use as the lanthanide compound in the processes of the first embodiment include, but are not limited to, neodymium methylxanthate, neodymium ethylxanthate, neodymium isopropylxanthate, neodymium butylxanthate, and neodymium benzylxanthate.

Examples of suitable neodymium β-diketonates for use as the lanthanide compound in the processes of the first embodiment include, but are not limited to, neodymium acetylacetonate, neodymium trifluoroacetylacetonate, neodymium hexafluoroacetylacetonate, neodymium benzoylacetonate, and neodymium 2,2,6,6-tetramethyl-3,5-heptanedionate.

Examples of suitable neodymium alkoxides or aryloxides for use as the lanthanide compound in the processes of the first embodiment include, but are not limited to, neodymium methoxide, neodymium ethoxide, neodymium isopropoxide, neodymium 2-ethylhexoxide, neodymium phenoxide, neodymium nonylphenoxide, and neodymium naphthoxide.

Examples of suitable neodymium halides for use as the lanthanide compound in the processes of the first embodiment include, but are not limited to, neodymium fluoride, neodymium chloride, neodymium bromide, and neodymium iodide. Suitable neodymium pseudo-halides include, but are not limited to, neodymium cyanide, neodymium cyanate, neodymium thiocyanate, neodymium azide, and neodymium ferrocyanide. Suitable neodymium oxyhalides include, but are not limited to, neodymium oxyfluoride, neodymium oxychloride, and neodymium oxybromide. A Lewis base, such as tetrahydrofuran ("THF"), can be employed as an aid for solubilizing this class of neodymium compounds in inert organic solvents. Where lanthanide halides, lanthanide oxyhalides, or other lanthanide compounds containing a halogen atom are used, the lanthanide compound may optionally also provide all or part of the halogen source in the lanthanide-based catalyst system.

As used herein, the term "organolanthanide compound" refers to any lanthanide compound containing at least one lanthanide-carbon bond. These compounds are predominantly, though not exclusively, those containing cyclopentadienyl ("Cp"), substituted cyclopentadienyl, allyl, and substituted allyl ligands. Suitable organolanthanide compounds for use as the lanthanide compound in the processes of the first embodiment include, but are not limited to, $Cp_3Ln$, $Cp_2LnR$, $Cp_2LnCl$, $CpLnCl_2$, $CpLn(cyclooctatetraene)$, $(C_5Me_5)_2LnR$, $LnR_3$, $Ln(allyl)_3$, and $Ln(allyl)_2Cl$, where Ln represents a lanthanide atom, and R represents a hydrocarbyl group or a substituted hydrocarbyl group. In one or more embodiments, hydrocarbyl groups or substituted hydrocarbyl groups useful in the processes of the first embodiment may contain heteroatoms such as, for example, nitrogen, oxygen, boron, silicon, sulfur, and phosphorus atoms.

As mentioned above, the lanthanide-based catalyst system employed in the processes of the first embodiment includes an alkylating agent. In accordance with one or more embodiments of the processes of the first embodiment, alkylating agents, which may also be referred to as hydrocarbylating agents, include organometallic compounds that can transfer one or more hydrocarbyl groups to another metal. Generally, these agents include organometallic compounds of electropositive metals such as Groups 1, 2, and 3 metals (Groups IA, IIA, and IIIA metals). Alkylating agents useful in the processes of the first embodiment include, but are not limited to, organoaluminum and organomagnesium compounds. As used herein, the term "organoaluminum compound" refers to any aluminum-containing compound having at least one aluminum-carbon bond. In one or more embodiments, organoaluminum compounds that are soluble in a hydrocarbon solvent can be used. As used herein, the term "organomagnesium compound" refers to any magnesium-containing compound having at least one magnesium-carbon bond. In one or more embodiments, organomagnesium compounds that are soluble in a hydrocarbon can be used. As will be described in more detail below, certain suitable alkylating agents may be in the form of a halide compound. Where the alkylating agent includes a halogen atom, the alkylating agent may optionally also provide all or part of the halogen source in the lanthanide-based catalyst system.

In one or more embodiments of the processes of the first embodiment, organoaluminum compounds that are utilized include those represented by the general formula $AlR^a_nX_{3-n}$, where each $R^a$ independently is a monovalent organic group that is attached to the aluminum atom via a carbon atom; where each X independently is a hydrogen atom, a halogen atom, a carboxylate group, an alkoxide group, or an aryloxide group; and where n is an integer in the range of from 1 to 3. In one or more embodiments, each $R^a$ independently is a hydrocarbyl group or a substituted hydrocarbyl group including, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing from 1 carbon atom, or the appropriate minimum number of atoms to form the group, up to 20 carbon atoms (e.g., 2, 3, 4, 5, 6, 7, 8, 9, 10, 11, 12, 13, 14, 15, 16, 17, 18, 19 or 20 carbon atoms). These hydrocarbyl groups or substituted hydrocarbyl groups may optionally contain heteroatoms including, but not limited to, nitrogen, oxygen, boron, silicon, sulfur, and phosphorus atoms.

Examples of types of organoaluminum compounds for use as the alkylating agent in the processes of the first embodiment that are represented by the general formula $AlR^a_nX_{3-n}$ include, but are not limited to, trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum halide, hydrocarbylaluminum dihalide, dihydrocarbylaluminum aryloxide, and hydrocarbylaluminum diaryloxide compounds.

Examples of suitable trihydrocarbylaluminum compounds for use as the alkylating agent in the processes of the first embodiment include, but are not limited to, trim ethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris (1-methylcyclopentyl)aluminum, triphenylaluminum, tri-p-tolylaluminum, tris(2,6-dimethylphenyl) aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

Examples of suitable dihydrocarbylaluminum hydride compounds for use as the alkylating agent in the processes of the first embodiment include, but are not limited to, diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride.

Examples of suitable hydrocarbylaluminum dihydrides for use as the alkylating agent in the processes include, but are not limited to, ethylaluminum dihydride, n-propylaluminum dihydride, isopropylaluminum dihydride, n-butylaluminum dihydride, isobutylaluminum dihydride, and n-octylaluminum dihydride.

Examples of suitable dihydrocarbylaluminum halide compounds for use as the alkylating agent in the processes of the first embodiment include, but are not limited to, diethylaluminum chloride, di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n-butylaluminum chloride, phenylisobutylaluminum chloride, phenyl-n-octylaluminum chloride, p-tolylethylaluminum chloride, p-tolyl-n-propylaluminum chloride, p-tolylisopropylaluminum chloride, p-tolyl-n-butylaluminum chloride, p-tolylisobutylaluminum chloride, p-tolyl-n-octylaluminum chloride, benzylethylaluminum chloride, benzyl-n-propylaluminum chloride, benzylisopropylaluminum chloride, benzyl-n-butylaluminum chloride, benzylisobutylaluminum chloride, and benzyl-n-octylaluminum chloride.

Examples of suitable hydrocarbylaluminum dihalide compounds for use as the alkylating agent in the processes of the first embodiment include, but are not limited to, ethylaluminum dichloride, n-propylaluminum dichloride, isopropylaluminum dichloride, n-butylaluminum dichloride, isobutylaluminum dichloride, and n-octylaluminum dichloride.

Examples of other suitable organoaluminum compounds for use as the alkylating agent in the processes of the first embodiment that are represented by the general formula $AlR^a_n X_{3-n}$ include, but are not limited to, dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, and isobutylaluminum diphenoxide.

Another class of organoaluminum compounds suitable for use as an alkylating agent in the processes of the first embodiment is aluminoxanes. Suitable aluminoxanes include oligomeric linear aluminoxanes, which can be represented by the general formula:

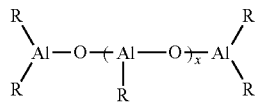

and oligomeric cyclic aluminoxanes, which can be represented by the general formula:

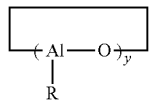

where x is an integer in the range of from 1 to 100 (e.g., 1, 10, 20, 30, 40, 50, 60, 70, 80, 90, or 100), or 10 to 50 (e.g., 10, 15, 20, 25, 30, 35, 40, 45, or 50); y is an integer in the range of from 2 to 100 (e.g., 2, 10, 20, 30, 40, 50, 60, 70, 80, 90 or 100), or 3 to 20 (e.g., 3, 5, 10, 15, or 20); and where each R independently is a monovalent organic group that is attached to the aluminum atom via a carbon atom. In one embodiment of the processes of the first embodiment, each R independently is a hydrocarbyl group or a substituted hydrocarbyl group including, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of atoms to form the group, up to 20 carbon atoms (e.g., 2, 3, 4, 5, 6, 7, 8, 9, 10, 11, 12, 13, 14, 15, 16, 17, 18, 19 or 20 carbon atoms). These hydrocarbyl groups or substituted hydrocarbyl groups may also contain heteroatoms including, but not limited to, nitrogen, oxygen, boron, silicon, sulfur, and phosphorus atoms. As used herein, the number of moles of the aluminoxane refers to the number of moles of the aluminum atoms rather than the number of moles of the oligomeric aluminoxane molecules. This convention is commonly employed in the art of catalyst systems utilizing aluminoxanes.

Aluminoxanes can be prepared by reacting trihydrocarbylaluminum compounds with water. This reaction can be performed according to known methods, such as, for example, (1) a method in which the trihydrocarbylaluminum compound is dissolved in an organic solvent and then contacted with water, (2) a method in which the trihydrocarbylaluminum compound is reacted with water of crystallization contained in, for example, metal salts, or water adsorbed in inorganic or organic compounds, or (3) a method in which the trihydrocarbylaluminum compound is reacted with water in the presence of the monomer or monomer solution that is to be polymerized.

Examples of suitable aluminoxane compounds for use as the alkylating agent in the processes of the first embodiment include, but are not limited to, methylaluminoxane ("MAO"), modified methylaluminoxane ("MMAO"), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methylcyclopentylaluminoxane, phenylaluminoxane, and 2,6-dimethylphenylaluminoxane. In certain preferred embodiments of the processes of the first embodiment, the alkylating agent includes MAO. Modified methylaluminoxane can be formed by substituting from 20 to 80 percent of the methyl groups of methylaluminoxane with $C_2$ to $C_{12}$ hydrocarbyl groups (e.g., $C_2$, $C_3$, $C_4$, $C_5$, $C_6$, $C_7$, $C_8$, $C_9$, $C_{10}$, $C_{11}$ or $C_{12}$), preferably with isobutyl groups, by using techniques known to those skilled in the art.

In accordance with certain embodiments of the processes of the first embodiment, aluminoxanes can be used alone or in combination with other organoaluminum compounds. In one embodiment of the first embodiment, methylaluminoxane and at least one organoaluminum compound other than aluminoxane, e.g., an organoaluminum compound represented by $AlR^a_n X_{3-n}$, are used in combination as the alkylating agent. In accordance with this and other embodiments, the alkylating agent comprises a dihydrocarbylaluminum hydride, a dihydrocarbylaluminum halide, an aluminoxane, or combinations thereof. For example, in accordance with one embodiment, the alkylating agent comprises diisobutylaluminum hydride, diethylaluminum chloride, methylaluminoxane, or combinations thereof. U.S. Pat. No. 8,017,695, which is incorporated herein by reference in its entirety, provides other examples where aluminoxanes and organoaluminum compounds can be employed in combination.

As mentioned above, suitable alkylating agents used in the processes of the first embodiment include organomagnesium compounds. In accordance with one or more embodiments, of the processes of the first embodiment, suitable organomagnesium compounds include those represented by the general formula $MgR^b{}_2$, where each $R^b$ independently is a monovalent organic group that is attached to the magnesium atom via a carbon atom. In one or more embodiments, each $R^b$ independently is a hydrocarbyl group or a substituted hydrocarbyl group including, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of atoms to form the group, up to 20 carbon atoms (e.g., 2, 3, 4, 5, 6, 7, 8, 9, 10, 11, 12, 13, 14, 15, 16, 17, 18, 19 or 20 carbon atoms). These hydrocarbyl groups or substituted hydrocarbyl groups may also optionally contain heteroatoms including, but not limited to, nitrogen, oxygen, silicon, sulfur, and phosphorus atoms.

Examples of suitable organomagnesium compounds for use as the alkylating agent in the processes of the first embodiment that are represented by the general formula $MgR^b{}_2$ include, but are not limited to, diethylmagnesium, di-n-propylmagnesium, diisopropylmagnesium, dibutylmagnesium, dihexylmagnesium, diphenylmagnesium, and dibenzylmagnesium.

Another class of organomagnesium compounds suitable for use as an alkylating agent in accordance with embodiments of the processes of the first embodiment is represented by the general formula $R^cMgX^c$, where $R^c$ is a monovalent organic group that is attached to the magnesium atom via a carbon atom, and X is a hydrogen atom, a halogen atom, a carboxylate group, an alkoxide group, or an aryloxide group. In one or more embodiments, $R^c$ is a hydrocarbyl group or a substituted hydrocarbyl group including, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group containing from 1 carbon atom, or the appropriate minimum number of atoms to form the group, up to 20 carbon atoms (e.g., 2, 3, 4, 5, 6, 7, 8, 9, 10, 11, 12, 13, 14, 15, 16, 17, 18, 19 or 20 carbon atoms). These hydrocarbyl groups or substituted hydrocarbyl groups may also contain heteroatoms including, but not limited to, nitrogen, oxygen, boron, silicon, sulfur, and phosphorus atoms. In one embodiment, $X^c$ is a carboxylate group, an alkoxide group, or an aryloxide group, with each group containing from 1 carbon atom up to 20 carbon atoms (e.g., 2, 3, 4, 5, 6, 7, 8, 9, 10, 11, 12, 13, 14, 15, 16, 17, 18, 19 or 20 carbon atoms).

Examples of suitable types of organomagnesium compounds for use as the alkylating agent in the processes of the first embodiment that are represented by the general formula $R^cMgX^c$ include, but are not limited to, hydrocarbylmagnesium hydride, hydrocarbylmagnesium halide, hydrocarbylmagnesium carboxylate, hydrocarbylmagnesium alkoxide, and hydrocarbylmagnesium aryloxide.

Examples of suitable organomagnesium compounds for use as the alkylating agent in the processes of the first embodiment represented by the general formula $R^cMgX^c$ include, but are not limited to, methylmagnesium hydride, ethylmagnesium hydride, butylmagnesium hydride, hexylmagnesium hydride, phenylmagnesium hydride, benzylmagnesium hydride, methylmagnesium chloride, ethylmagnesium chloride, butylmagnesium chloride, hexylmagnesium chloride, phenylmagnesium chloride, benzylmagnesium chloride, methylmagnesium bromide, ethylmagnesium bromide, butylmagnesium bromide, hexylmagnesium bromide, phenylmagnesium bromide, benzylmagnesium bromide, methylmagnesium hexanoate, ethylmagnesium hexanoate, butylmagnesium hexanoate, hexylmagnesium hexanoate, phenylmagnesium hexanoate, benzylmagnesium hexanoate, methylmagnesium ethoxide, ethylmagnesium ethoxide, butylmagnesium ethoxide, hexylmagnesium ethoxide, phenylmagnesium ethoxide, benzylmagnesium ethoxide, methylmagnesium phenoxide, ethylmagnesium phenoxide, butylmagnesium phenoxide, hexylmagnesium phenoxide, phenylmagnesium phenoxide, and benzylmagnesium phenoxide.

As mentioned above, the lanthanide-based catalyst systems employed in the processes of the first embodiment include a halogen source. As used herein, the term "halogen source" refers to any substance including at least one halogen atom. In accordance with one or more embodiments of the processes of the first embodiment, all or part of the halogen source may optionally be provided by the lanthanide compound, the alkylating agent, or both the lanthanide compound and the alkylating agent. In other words, the lanthanide compound may serve as both the lanthanide compound and all or at least a portion of the halogen source. Similarly, the alkylating agent may serve as both the alkylating agent and all or at least a portion of the halogen source.

In accordance with certain embodiments of the processes of the first embodiment, at least a portion of the halogen source may be present in the catalyst system in the form of a separate and distinct halogen-containing compound. Various compounds, or mixtures thereof, that contain one or more halogen atoms can be used as the halogen source. Examples of halogen atoms include, but are not limited to, fluorine, chlorine, bromine, and iodine. A combination of two or more halogen atoms can also be utilized. Halogen-containing compounds that are soluble in an organic solvent, such as the aromatic hydrocarbon, aliphatic hydrocarbon, and cycloaliphatic hydrocarbon solvents disclosed herein, are suitable for use as the halogen source in the processes of the first embodiment. In addition, hydrocarbon-insoluble halogen-containing compounds that can be suspended in a polymerization system to form the catalytically active species are also useful in certain embodiments of the processes of the first embodiment.

Examples of suitable types of halogen-containing compounds for use in the processes of the first embodiment include, but are not limited to, elemental halogens, mixed halogens, hydrogen halides, organic halides, inorganic halides, metallic halides, and organometallic halides. In certain preferred embodiments of the processes of the first embodiment, the halogen-containing compound includes an organometallic halide.

Examples of elemental halogens suitable for use as the halogen source in the processes of the first embodiment include, but are not limited to, fluorine, chlorine, bromine, and iodine. Some specific examples of suitable mixed halogens include, but are not limited to, iodine monochloride, iodine monobromide, iodine trichloride, and iodine pentafluoride.

Examples of suitable hydrogen halides for use as the halogen source in the processes disclosed include, but are not limited to, hydrogen fluoride, hydrogen chloride, hydrogen bromide, and hydrogen iodide.

Examples of suitable organic halides for use as the halogen source in the processes of the first embodiment include, but are not limited to, t-butyl chloride, t-butyl bromide, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylchlorosilane, benzoyl chloride, benzoyl bromide, propionyl chloride, propionyl bromide, methyl chloroformate, and methyl bromoformate.

Examples of suitable inorganic halides for use as the halogen source in the processes of the first embodiment include, but are not limited to, phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride, silicon tetrabromide, silicon tetraiodide, arsenic trichloride, arsenic tribromide, arsenic triiodide, selenium tetrachloride, selenium tetrabromide, tellurium tetrachloride, tellurium tetrabromide, and tellurium tetraiodide.

Examples of suitable metallic halides for use as the halogen source in the processes of the first embodiment include, but are not limited to, tin tetrachloride, tin tetrabromide, aluminum trichloride, aluminum tribromide, antimony trichloride, antimony pentachloride, antimony tribromide, aluminum triiodide, aluminum trifluoride, gallium trichloride, gallium tribromide, gallium triiodide, gallium trifluoride, indium trichloride, indium tribromide, indium triiodide, indium trifluoride, titanium tetrachloride, titanium tetrabromide, titanium tetraiodide, zinc dichloride, zinc dibromide, zinc diiodide, and zinc difluoride.

Examples of suitable organometallic halides for use as the halogen source in the processes of the first embodiment include, but are not limited to, dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride, isobutylaluminum sesquichloride, methylmagnesium chloride, methylmagnesium bromide, methylmagnesium iodide, ethylmagnesium chloride, ethylmagnesium bromide, butylmagnesium chloride, butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, dibutyltin dichloride, dibutyltin dibromide, tributyltin chloride, and tributyltin bromide. In accordance with one embodiment, the halogen source comprises an organometallic halide. For example, in accordance with certain embodiments, the halogen source comprises diethylaluminum chloride, which as mentioned above can also serve as an alkylating agent in the lanthanide-based catalyst system. Thus, in accordance with certain embodiments of the processes of the first embodiment, the halogen source may be provided in all or in part by the alkylating agent in the catalyst systems disclosed herein.

The lanthanide-based catalyst system used in the process of the first embodiment may be formed by combining or mixing the foregoing catalyst ingredients. The terms "catalyst composition" and "catalyst system," as referred to herein, encompass a simple mixture of the ingredients, a complex of the various ingredients that is caused by physical or chemical forces of attraction, a chemical reaction product of the ingredients, or a combination of the foregoing. The terms "catalyst composition" and "catalyst system" can be used interchangeably herein.

Nickel-Based Catalyst System

As mentioned above, the process of the first embodiment may utilize a nickel-based catalyst system comprising (i) a nickel compound, optionally in combination with an alcohol, (ii) an organoaluminum, organomagnesium, organozinc compound, or a combination thereof, and (iii) a fluorine-containing compound or a complex thereof. The particular compounds used for each of (i), (ii) and (iii) may vary.

According to the processes of the first embodiment, the nickel compound that is used in the nickel-based catalyst system may vary. The nickel atom in the nickel-containing compound can be in various oxidation states including but not limited to the 0, +2, +3, and +4 oxidation states. Suitable nickel-containing compounds for use in a nickel-based catalyst system according to the process of the first embodiment include, but are not limited to, nickel carboxylates, nickel carboxylate borates, nickel organophosphates, nickel organophosphonates, nickel organophosphinates, nickel carbamates, nickel dithiocarbamates, nickel xanthates, nickel β-diketonates, nickel alkoxides or aryloxides, nickel halides, nickel pseudo-halides, nickel oxyhalides, and organonickel compounds, in preferred embodiments of the process of the first embodiment, when a nickel-based catalyst system is used, the nickel compound is a nickel carboxylate.

Suitable nickel carboxylates can include nickel formate, nickel acetate, nickel acrylate, nickel methacrylate, nickel valerate, nickel gluconate, nickel citrate, nickel fumarate, nickel lactate, nickel maleate, nickel oxalate, nickel 2-ethylhexanoate, nickel neodecanoate, nickel naphthenate, nickel stearate, nickel oleate, nickel benzoate, and nickel picolinate.

Suitable nickel carboxylate borates may include compounds defined by the formulae $(RCOONiO)_3B$ or $(RCOONiO)_7B(OR)$, where each R, which may be the same or different, is a hydrogen atom or a mono-valent organic group. In one embodiment, each R may be a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, silicon, sulfur, and phosphorus atoms. Nickel carboxylate borate may include those disclosed in U.S. Pat. No. 4,522,988, which is incorporated herein by reference. Specific examples of nickel carboxylate borate include nickel(II) neodecanoate borate, nickel(II) hexanoate borate, nickel(II) naphthenate borate, nickel(II) stearate borate, nickel(II) octoate borate, nickel(II) 2-ethylhexanoate borate, and mixtures thereof.

Suitable nickel organophosphates can include nickel dibutyl phosphate, nickel dipentyl phosphate, nickel dihexyl phosphate, nickel diheptyl phosphate, nickel dioctyl phosphate, nickel bis(1-methylheptyl)phosphate, nickel bis(2-ethylhexyl)phosphate, nickel didecyl phosphate, nickel didodecyl phosphate, nickel dioctadecyl phosphate, nickel dioleyl phosphate, nickel diphenyl phosphate, nickel bis(p-nonylphenyl)phosphate, nickel butyl(2-ethylhexyl)phosphate, nickel (1-methylheptyl) (2-ethylhexyl)phosphate, and nickel (2-ethylhexyl) nonylphenyl)phosphate.

Suitable nickel organophosphonates can include nickel butyl phosphonate, nickel pentyl phosphonate, nickel hexyl phosphonate, nickel heptyl phosphonate, nickel octyl phosphonate, nickel (1-methylheptyl)phosphonate, nickel (2-ethylhexyl)phosphonate, nickel decyl phosphonate, nickel dodecyl phosphonate, nickel octadecyl phosphonate, nickel oleyl phosphonate, nickel phenyl phosphonate, nickel (p-nonylphenyl)phosphonate, nickel butyl butylphosphonate, nickel pentyl pentylphosphonate, nickel hexyl hexylphosphonate, nickel heptyl heptylphosphonate, nickel octyl octylphosphonate, nickel (1-methylheptyl) methylheptyl)phosphonate, nickel (2-ethylhexyl) (2-ethylhexyl)phosphonate, nickel decyl decylphosphonate, nickel dodecyl dodecylphosphonate, nickel octadecyl octadecylphosphonate, nickel oleyl oleylphosphonate, nickel phenyl phenylphosphonate, nickel (p-nonylphenyl) (p-nonylphenyl) phosphonate, nickel butyl(2-ethylhexyl)phosphonate, nickel (2-ethylhexyl)butylphosphonate, nickel (1-methylheptyl) (2-ethylhexyl)phosphonate, nickel (2-ethylhexyl) (1-methylheptyl)phosphonate, nickel (2-ethylhexyl) (p-nonylphenyl)phosphonate, and nickel (p-nonylphenyl) (2-ethylhexyl) phosphonate.

Suitable nickel organophosphinates can include nickel butylphosphinate, nickel pentylphosphinate, nickel hexylphosphinate, nickel heptylphosphinate, nickel octylphosphinate, nickel (1-methylheptyl)phosphinate, nickel (2-ethylhexyl)phosphinate, nickel decylphosphinate, nickel didecylphosphinate, nickel octadecylphosphinate, nickel oleylphosphinate, nickel phenylphosphinate, nickel (p-nonylphenyl)phosphinate, nickel dibutylphosphinate, nickel dipentylphosphinate, nickel dihexylphosphinate, nickel diheptylphosphinate, nickel dioctylphosphinate, nickel bis (1-methylheptyl)phosphinate, nickel bis(2-ethylhexyl)phosphinate, nickel didecylphosphinate, nickel didodecylphosphinate, nickel dioctadecylphosphinate, nickel dioleylphosphinate, nickel diphenylphosphinate, nickel bis (p-nonylphenyl)phosphinate, nickel butyl(2-ethylhexyl) phosphinate, nickel (1-methylheptyl)(2-ethylhexyl)phosphinate, and nickel (2-ethylhexyl) (p-nonylphenyl)phosphinate.

Suitable nickel carbamates can include nickel dimethylcarbamate, nickel diethylcarbamate, nickel diisopropylcarbamate, nickel dibutylcarbamate, and nickel dibenzylcarbamate.

Suitable nickel dithiocarbamates can include nickel dimethyldithiocarbamate, nickel diethyldithiocarbamate, nickel diisopropyldithiocarbamate, nickel dibutyldithiocarbamate, and nickel dibenzyldithiocarbamate.

Suitable nickel xanthates include nickel methylxanthate, nickel ethylxanthate, nickel isopropylxanthate, nickel butylxanthate, and nickel benzylxanthate.

Suitable nickel β-diketonates can include nickel acetylacetonate, nickel trifluoroacetylacetonate, nickel hexafluoroacetylacetonate, nickel benzoylacetonate, and nickel 2,2,6,6-tetramethyl-3,5-heptanedionate.

Suitable nickel alkoxides or aryloxides can include nickel methoxide, nickel ethoxide, nickel isopropoxide, nickel 2-ethylhexoxide, nickel phenoxide, nickel nonylphenoxide, and nickel naphthoxide.

Suitable nickel halides can include nickel fluoride, nickel chloride, nickel bromide, and nickel iodide. Nickel pseudohalides include nickel cyanide, nickel cyanate, nickel thiocyanate, nickel azide, and nickel ferrocyanide. Nickel oxyhalides include nickel oxyfluoride, nickel oxychloride and nickel oxybromide. Where the nickel halides, nickel oxyhalides or other nickel-containing compounds contain labile fluorine or chlorine atoms, the nickel-containing compounds can also serve as the fluorine-containing compound or the chlorine-containing compound. A Lewis base such as an alcohol can be used as a solubility aid for this class of compounds.

The term organonickel compound may refer to any nickel compound containing at least one nickel-carbon bond. Organonickel compounds include bis(cyclopentadienyl) nickel (also called nickelocene), bis(pentamethylcyclopentadienyl) nickel (also called decamethylnickelocene), bis(tetramethylcyclopentadienyl) nickel, bis(ethylcyclopentadienyl) nickel, bis(isopropylcyclopentadienyl) nickel, bis(pentadienyl)nickel, bis(2,4-dimethylpentadienyl)nickel, (cyclopentadienyl) (pentadienyl) nickel, bis(1,5-cyclooctadiene) nickel, bis(allyl)nickel, bis(methallyl)nickel, and bis(crotyl) nickel.

According to the processes of the first embodiment, the organoaluminum, organomagnesium compound, organozinc compound, or a combination thereof that is used for the (ii) component of the nickel-based catalyst system may vary. In preferred embodiments, when the process of the first embodiment utilizes a nickel-based catalyst system, the component (ii) is an organoaluminum or organomagnesium compound, more preferably an organoaluminum compound. When the organoaluminum, organomagnesium, car organozinc compound includes labile fluorine it may also serve as the fluorine-containing compound (with no need for a separate fluorine-containing compound). In certain embodiments, the organoaluminum, organomagnesium or organozinc compound is devoid of chlorine or bromine atoms.

Suitable compounds for use as an organoaluminum compound or organomagnesium compound in a nickel-based catalyst system are discussed above in the section on lanthanide-based catalyst systems.

According to the processes of the first embodiment, the fluorine-containing compound that is used in the nickel-based catalyst system may vary. Suitable fluorine-containing compounds may include various compounds, or mixtures thereof, that contain one or more labile fluorine atoms. In one or more embodiments, the fluorine-containing compound may be soluble in a hydrocarbon solvent in other embodiments, hydrocarbon-insoluble fluorine-containing compounds, which can be suspended in the polymerization medium to form the catalytically active species, may be useful.

Suitable types of fluorine-containing compounds include, but are not limited to, elemental fluorine, halogen fluorides, hydrogen fluoride, organic fluorides, inorganic fluorides, metallic fluorides, organometallic fluorides, and mixtures thereof. In one or more embodiments, the complexes of the fluorine-containing compounds with a Lewis base such as ethers, alcohols, water, aldehydes, ketones, esters, nitriles, or mixtures thereof may be employed. Specific examples of these complexes include the complexes of boron trifluoride and hydrogen fluoride with a Lewis base.

Halogen fluorides may include iodine monofluoride, iodine trifluoride, and iodine pentafluoride.

Organic fluorides may include t-butyl fluoride, allyl fluoride, benzyl fluoride, fluoro-di-phenylmethane, triphenylmethyl fluoride, benzylidene fluoride, methyltrifluorosilane, phenyltrifluorosilane, dimethyldifluorosilane, diphenyldifluorosilane, trimethylfluorosilane, benzoyl fluoride, propionyl fluoride, and methyl fluoroformate.

Inorganic fluorides may include phosphorus trifluoride, phosphorus pentafluoride, phosphorus oxyfluoride, boron trifluoride, silicon tetrafluoride, arsenic trifluoride, selenium tetrafluoride, and tellurium tetrafluoride.

Metallic fluorides may include tin tetrafluoride, aluminum trifluoride, antimony trifluoride, antimony pentafluoride, gallium trifluoride, indium trifluoride, titanium tetrafluoride, and zinc difluoride.

Organometallic fluorides may include dimethylaluminum fluoride, diethylaluminum fluoride, methylaluminum difluoride, ethylaluminum difluoride, methylaluminum sesquifluoride, ethylaluminum sesquifluoride, isobutylaluminum sesquifluoride, methylmagnesium fluoride, ethylmagnesium fluoride, butylmagnesium fluoride, phenylmagnesium fluoride, benzylmagnesium fluoride, trimethyltin fluoride, triethyltin fluoride, di-t-butyltin difluoride, dibutyltin difluoride, and tributyltin fluoride.

As mentioned above, when the process of the first embodiment utilizes a nickel-based catalyst system, the nickel compound may be used in combination with an alcohol. Various alcohols and mixtures may be employed. In one or more embodiments, the alcohols include monohydric alcohols (i.e. those including one hydroxyl group), and in other embodiments the alcohols include multihydric alcohols (i.e. those including two or more hydroxyl groups) including dihydric alcohols, which may be referred to as glycols or diols, trihydric alcohols, which may be referred to as glycerols, and polyhydric alcohols. In one or more embodiments, the alcohols include primary and/or secondary alcohols. Primary and secondary alcohols include those alcohols wherein the α-carbon the carbon adjacent to the carbon including the hydroxyl group) is primary or secondary. In certain preferred embodiments, when a nickel-based catalyst system is used, a monohydric alcohol, preferably hexanol is utilized.

The alcohols may include aliphatic alcohols, which include straight chain or branched alcohols. In other embodiments, the alcohols may include cyclic alcohols, in other embodiments aromatic alcohols, in other embodiments heterocyclic alcohols, and in other embodiments polycyclic alcohols.

In these or other embodiments, the alcohols may be saturated, and in other embodiments they may unsaturated. In certain embodiments, useful alcohols include those alcohols that are soluble, or at least partially soluble, within the reaction medium in which the polymerization takes place.

In one or more embodiments, useful alcohols may be defined by the formula R OH, where R is a monovalent organic group, and —OH is a hydroxyl group. Monovalent organic groups may include hydrocarbyl groups or substituted hydrocarbyl groups such as, but not limited to alkyl, cycloalkyl, substituted cycloalkyl, alkenyl, cycloalkenyl, substituted cycloalkenyl, aryl, allyl, substituted aryl, aralkyl, alkaryl, and alkynyl groups. Substituted groups include those groups where a hydrogen atom of the group is itself replaced by a monovalent organic group. These hydrocarbyl groups may contain heteroatoms such as, but not limited to, nitrogen, oxygen, silicon, tin, sulfur, boron, and phosphorous atoms. In certain embodiments, the hydrocarbyl group may be devoid of halogen atoms such as a chlorine or bromine atom. In certain embodiments, the monovalent organic group may contain one or more hydroxyl groups attached thereto. As a result, the alcohol may contain two or more hydroxyl groups. In other embodiments, the hydrocarbyl groups are devoid of heteroatoms.

In one or more embodiments, useful alcohols include from 1 to about 40 carbon atoms, in other embodiments from about 2 to about 26 carbon atoms, in other embodiments from about 4 to about 18 carbon atoms, and in other embodiments from about 6 to about 12 carbon atoms.

Exemplary aliphatic alcohols include methanol, ethanol, propanol, isopropanol, n-butanol, t-butanol, isobutanol, n-pentanol, n-hexanol, 2-ethyl hexanol, n-heptanol, octanol, decanol, and mixtures thereof.

Exemplary cyclic alcohols include cyclohexanol, methanol, t-butyl cyclohexanol, cyclopentanol, cycloheptanol, cyclooctanol, and mixtures thereof.

Exemplary unsaturated alcohols include allyl alcohol, and mixtures thereof.

Exemplary aromatic alcohols include substituted phenol, phenol, benzyl alcohol, and mixtures thereof.

Exemplary heterocyclic alcohols include furfuryl alcohol, and mixtures thereof.

Exemplary polycyclic alcohols include sterols, and mixtures thereof

The foregoing catalyst compositions may have high catalytic activity for polymerizing conjugated dienes into stereospecific polydienes over a wide range of catalyst concentrations and catalyst ingredient ratios. It is believed that the catalyst ingredients may interact to form an active catalyst species. It is also believed that the optimum concentration for any one catalyst ingredient may be dependent upon the concentration of the other catalyst ingredients.

In one or more embodiments, the molar ratio of the (ii) component to the nickel-containing compound can be varied from about 1:1 to about 200:1, in other embodiments from about 3:1 to about 30:1, and in other embodiments from about 5:1 to about 15:1. The term molar ratio, as used herein, refers to the equivalent ratio of relevant components of the ingredients, the ratio of equivalents of aluminum atoms on the aluminum-containing compound to equivalents of nickel atoms on the nickel-containing compound. In other words, where difunctional or polyfunctional compounds (e.g., those compounds including two or more carboxylic acid groups) are employed, fewer moles of the compound are required to achieve the desired equivalent ratio.

In one or more embodiments, the molar ratio of the fluorine-containing compound to the nickel-containing compound (F/Ni) can be varied from about 7:1 to about 500:1, in other embodiments from about 7.5:1 to about 450:1, and in other embodiments from about 8:1 to about 400:1.

In one or more embodiments, the molar ratio of the alcohol to the nickel-containing compound (—OH/Ni) can be varied from about 0.4:1 to about 80:1, in other embodiments from about 0.5:1 to about 75:1, and in other embodiments from about 0.7:1 to about 55:1. The term molar ratio, as used herein, refers to the equivalent ratio of relevant components of the ingredients, e.g., the ratio of equivalents of chlorine atoms on the chlorine-containing compound to equivalents of nickel atoms on the nickel-containing compound.

Generally, the nickel-based catalyst system may be formed by combining or mixing the catalyst ingredients. Although an active catalyst species is believed to result from this combination, the degree of interaction or reaction between the various ingredients or components is not known with any great degree of certainty, Therefore, the term "catalyst system" has been employed to encompass a simple mixture of the ingredients, a complex of the various ingredients that is caused by physical or chemical forces of attraction, a chemical reaction product of the ingredients, or a combination of the foregoing.

The nickel-based catalyst system can be formed by using one of the following methods. In one or more embodiments, the nickel-based catalyst system may be formed in situ by adding the catalyst ingredients to a solution containing monomer and solvent or simply bulk monomer, in either a stepwise or simultaneous manner. In one embodiment, a mixture of the (ii) component, the nickel-containing compound, and the alcohol (when present) is formed. This mixture may be formed within a solvent. This mixture and the fluorine-containing compound may then be added to the monomer to be polymerized.

In one or more embodiments, the selected catalyst ingredients of the nickel-based catalyst system may be pre-mixed outside the polymerization system at an appropriate temperature, which may be from about −20° C. to about 80° C., and the resulting catalyst system may be aged for a period of time ranging from a few seconds to a few days and then added to the monomer.

In one or more embodiments, the mixture of the (ii) component, nickel-containing compound, and alcohol (when present) is formed in the presence of a small amount of monomer and optionally a solvent. That is, the selected catalyst ingredients may be formed in the presence of a small amount of conjugated diene monomer at an appropriate temperature, which may be from about −20° C. to about 80° C. The amount of conjugated diene monomer that may be used to form this mixture can range from about 1 to about 500 moles per mole, in other embodiments from about 5 to about 250 moles per mole, and in other embodiments from about 10 to about 100 moles per mole of the nickel-containing compound. The resulting composition may be aged for a period of time ranging from a few seconds to a few days and then added to the remainder of the conjugated diene monomer that is to be polymerized together with the fluorine-containing compound.

When a solution of the nickel-based catalyst system or one or more of the catalyst ingredients thereof is prepared outside the polymerization system as set forth in the foregoing methods, an organic solvent or carrier may be employed. The organic solvent may serve to dissolve the catalyst composition or ingredients, or the solvent may simply serve as a carrier in which the catalyst composition or ingredients may be suspended. The organic solvent may be inert to the catalyst composition. Useful solvents include hydrocarbon solvents such as aromatic hydrocarbons, aliphatic hydrocarbons, cycloaliphatic hydrocarbons and/or a mixture of two or more thereof. Non-limiting examples of aromatic hydrocarbon solvents include benzene, toluene, xylenes, ethylbenzene, diethylbenzene, mesitylene, and the like. Non-limiting examples of aliphatic hydrocarbon solvents include n-pentane, n-hexane, n-heptane, n-octane, n-nonane, n-decane, isopentane, isohexanes, isopentanes, isooctanes, 2,2-dimethylbutane, petroleum ether, kerosene, petroleum spirits, and the like. And, non-limiting examples of cycloaliphatic hydrocarbon solvents include cyclopentane, cyclohexane, methylcyclopentane, methylcyclohexane, and the like. Commercial mixtures of the above hydrocarbons may also be used.

Cobalt-Based Catalyst System

As mentioned above, the process of the first embodiment may utilize a cobalt-based catalyst system which comprises: (i) a cobalt compound, (ii) an organo aluminum halide, and (iii) optionally water. The particular compounds used for each of (i) and (ii) may vary.

Suitable cobalt compounds for use in the cobalt-based catalyst system include, but are not limited to, cobalt benzoate, cobalt acetate, cobalt boroacylate, cobalt naphthenate, bis(.alpha.-furyl dioxime) cobalt, cobalt hexanoate, cobalt octanoate, cobalt oxalate, cobalt tartrate, cobalt sorbate, cobalt adipate, cobalt palmitate, cobalt stearate, cobalt acetylacetonate, bis(salicylaldehyde ethylene diimine)cobalt, cobalt salicylaldehyde, dicobalt octacarbonyl and mixtures thereof. According to preferred embodiments, when the process of the first embodiment uses a cobalt-based catalyst system, the cobalt compound is a cobalt salt (the cobalt salt includes either two monovalent anions or one divalent anion). The anion in a cobalt salt is preferably derived from a $C_6$-$C_{20}$ organic acid.

Suitable organo aluminum halide compounds for use in the cobalt-based catalyst system include, but are not limited to, those discussed above for the lanthanide-based catalyst system. Suitable examples of organo aluminum halide compounds as discussed above include dihydrocarbyl aluminum halides and hydrocarbyl aluminum dihalides.

Preferably, the organo aluminum halide compound comprises a compound having the formula:

wherein: $R^5$ is a $C_2$-$C_{12}$ alkyl group, X is a halogen and p+q is 3.

More preferably, the organo aluminum halide compound is selected from the group comprising a diorgano (preferably dialkyl) aluminum chloride compound, an alkyl aluminum sesquichloride compound and mixtures thereof.

Even more preferably, the organo aluminum halide compound is selected from: (I) a mixture of: (a) an alkyl aluminum chloride selected from diethyl aluminum chloride and ethyl aluminum sesquichloride (this may be achieved by a mixture containing approximately equimolar amounts of diethyl aluminum chloride and ethyl aluminum dichloride), and (b) an organoaluminum compound of formula $R_3Al$ wherein R is $C_8$-$C_{12}$ alkyl group (e.g., trioctyl aluminum, tridecyl aluminum and the like); and (H) an alkyl aluminum chloride wherein the alkyl group has 8 to 12 carbon atoms (e.g., dioctyl aluminum chloride, didecyl aluminum chloride and the like).

Embodiment (I) is more preferred, in this preferred embodiment, it is especially preferred to use the organoaluminum compound of formula $R_3Al$ is present in an amount of 0 to 1 percent by weight of the mixture of (I) and (II). A particularly preferred organoaluminum compound of formula $R_3Al$ comprises tri-octyl aluminum.

A preferred catalyst system for use in the present process comprises a cobalt salt selected from cobalt octoate and cobalt naphthenate, and an organo aluminumhalide compound selected from: (i) a mixture of diethyl aluminum chloride and one or more of trioctyl aluminum, tridecyl aluminum and tridodecyl aluminum, and (ii) one or more of dioctyl aluminum chloride, didecyl aluminum chloride and didodecyl aluminum chloride.

When a cobalt-based catalyst system is used in the process of the first embodiment, the ratios of components (i), (ii) and (iii) may vary. In certain embodiments, the molar ratio of cobalt compound to the total organo aluminum halide (e.g., diethyl aluminum chloride with trioctyl aluminum) is from about 1:15 to about 1:30 (e.g., 1:15, 1:20, 1:25, or 1:30), preferably from about 1:15 to about 1:20 (e.g., 1:15, 1:16, 1:17, 1:18, 1:19, or 1:20) and the molar ratio of halide (e.g., chlorine in the diethyl aluminum chloride) to the total metal content in the organo aluminum halide (e.g., aluminum in the diethyl aluminum chloride plus trioctyl aluminum) is from about 07:1 to about 0.95:1 (e.g., 0.7:1, 0.75:1, 0.8:1, 0.85:1, 0.9:1, or 0.95:1) preferably from about 0.8:1 to about 0.9:1 (e.g., 0.82:1, 0.84:1, 0.86:1, 0.88:1, or 0.9:1). In certain embodiments, the amount of water is from about 0.3 to about 0.8 (e.g., 0.4:1, 0.5:1, 0.6, 0.7, or 0,8), preferably from about 0.5 to about 0.65 (e.g., 0.5, 0.55, 0.6, or 0.65), millimoles per millimole of the organo aluminum halide used (e.g., alkyl aluminum chloride).

Functionalizing Compound

As discussed above, the process of the first embodiment includes reacting the living end polymer chains with a functionalizing compound of formula (I). As also discussed above, according to the second and third embodiments, the modified high-cis polybutadiene polymer includes polymer chains resulting from polymerization of 1,3-butadiene which are bonded to a residue of the functionalizing compound having formula (I), wherein each polymer chain is bonded to the residue of the functionalizing compound through the X group. In preferred embodiments of the first-third embodiments, the only functionalizing compound that is used to prepare the modified high-cis polybutadiene is a functionalizing compound of formula (I). Notably, in such embodiments, no dialkoxysilane compound or monoalkoxysilane compound (e.g., no cyano-hydrocarbylene-alkyl-dialkoxysilane and no cyano-hydrocarbylene-dialkylmonoalkoxysilane) is used as a functionalizing compound for the polybutadiene or otherwise present as a residue on the modified high-cis polybutadiene.

According to the first-third embodiments, formula (I) is as follows:

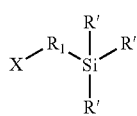

where X is a cyano group, $R^1$ is independently selected from hydrocarbylene of $C_1$-$C_{20}$, preferably $C_1$-$C_{10}$, more preferably $C_1$-$C_3$, wherein each of the foregoing optionally contain one unsaturated carbon-carbon bond, each R' is independently selected from alkoxy of $C_1$-$C_{20}$, preferably alkoxy of $C_1$-$C_{10}$, more preferably alkoxy of $C_1$-$C_6$, most preferably alkoxy of $C_1$ or $C_2$. In certain embodiments of the first-third embodiments, the functionalizing compound of formula (I) has a structure wherein $R^1$ and R' are all selected from the groups described as preferred. In other embodiments of the first-third embodiments, the functionalizing compound of formula (I) has a structure wherein $R^1$ and R' are all selected from the groups described as preferred. Since the functionalizing compound of formula (I) has three alkoxy groups on the Si, the compound can be referred to a trialkoxysilane. By stating that $R^1$ is a hydrocarbylene group is meant that that it is bonded to two other constituents (i.e., the X group and the Si). In certain preferred embodiments of the first-third embodiments, $R^1$ is aliphatic and unsaturated. In other embodiments of the first-third embodiment, $R^1$ is aliphatic and can include one unsaturated carbon-carbon bond. Generally, according to the first-third embodiments, the carbons in the $R^1$ group can be positioned in a linear configuration or may be branched.

As mentioned above, according to the first-third embodiments, the X of the functionalizing compound of formula (I) (or the residue resulting therefrom) is a cyano group. Non-limiting examples of suitable cyano groups that may be used as X in formula (I) according to certain embodiments of the first-third embodiments include compounds where the cyano group and the Si are separated by a hydrocarbylene group having 1-20 carbons, preferably 1-10 carbons, more preferably 1-3 carbons. Non-limiting examples of suitable cyano groups that may be used as X in formula (I) according to certain embodiments of the first-third embodiments include 2-cyanoethyltriethoxysilane (CETEOS), 2-cyanoethyltrimethoxysilane (CETMOS), 3-cyanopropyltriethoxysilane (CPTEOS), and 3-cyanopropyltrimethoxysilane (CPTMOS).

According to the first-third embodiments, polymer chains (which result from polymerization of 1,3-butadiene using one of the defined catalyst systems) are bonded to the functionalizing compound through the X group. Since the structure of the functionalizing compound will change somewhat upon bonding of a polymer chain to the X group, the moiety to which the polymer chain is bonded is described as a residue of a functionalizing compound. Generally, one polymer chain will bond to the residue of the functionalizing compound through the X group of each molecule of functionalizing compound. It is possible for more than one polymer chain to bond to the residue of the functionalizing compound. The location upon the functionalizing compound where the polymer chain bonds according to the process of the first embodiment (i.e., using one of the defined catalyst systems) can be contrasted with the location upon the functionalizing compound where the polymer chain would bond if an anionic initiator (e.g., n-butyl lithium) was used to polymerize 1,3-butadiene. More specifically, if an anionic initiator was used, polymer chains may bond to the functionalizing compound via an alkoxy group on the Si (replacing the OR of an OR alkoxy group and bonding directly to the Si) as well as through the X group. When one of the defined catalyst systems is used to polymerize 1,3-butadiene and produce living end polymer chains, the polymer chain bonds (only) to the functionalizing compound through the X group.

According to the first-third embodiments, the amount of functionalizing compound of formula (I) that is used to react with the living end polymer chains (i.e., according to the process of the first embodiment) or that is present in the modified high-cis polybutadiene polymer as a residue (i.e., according to the second and third embodiments) may vary. In certain embodiments of the first-third embodiments, the functionalizing compound is used in a molar ratio of 100:1 to 0.5:1 (e.g., 100:1, 90:1, 80:1, 70:1, 60:1, 50:1, 40:1, 30:1, 20:1, 10:1, 8:1, 6:1, 4:1, 2:1, 1:1, 0.5:1), preferably 50:1 to 1:1 (e.g., 50:1, 40:1, 30:1, 20:1, 10:1, 8:1, 6:1, 4:1, 2:1, or 1:1), more preferably 30:1 to 2:1 (e.g., 30:1, 25:1, 20:1, 15:1, 10:1, 8:1, 6:1, 4:1, or 2:1), the molar ratio based upon the moles of functionalizing compound to moles of primary metal in the catalyst system (i.e., moles of lanthanide for a lanthanide-based catalyst system, moles of nickel for a nickel-based catalyst system, or moles of cobalt for a cobalt-based catalyst system).

Stabilizing Agent

As mentioned above, according to process of the first embodiment, the modified high-cis polybutadiene (from step C) is reacted with a stabilizing agent of formula (II) as follows:

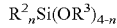

wherein $R^2$ is selected from the group consisting of $C_1$ to $C_{20}$ alkyl, $C_4$ to $C_{10}$ cycloalkyl, or $C_5$ to $C_{20}$ aromatic groups; preferably from the group consisting of $C_1$ to $C_{10}$ alkyl, $C_4$ to $C_6$ cycloalkyl, or $C_6$ to $C_{14}$ aromatic groups; and more preferably from $C_1$ to $C_6$ alkyl, $C_4$ to $C_6$ cycloalkyl, or $C_6$ aromatic groups, wherein $R^3$ may be the same as or different from $R^2$ and is selected from $C_1$ to $C_{20}$ alkyl, $C_4$ to $C_{10}$ cycloalkyl, or $C_5$ to $C_{20}$ aromatic groups; preferably from the group consisting of $C_1$ to $C_{10}$ alkyl, $C_4$ to $C_6$ cycloalkyl, or $C_6$ to $C_{14}$ aromatic groups; and more preferably from $C_1$ to $C_6$ alkyl, $C_4$ to $C_6$ cycloalkyl, or $C_6$ aromatic groups, and n is an integer of 1 to 3, preferably 2 to 3, more preferably 3. In certain embodiments of the process of the first embodiment, the stabilizing agent of formula (II) has $R^2$, $R^3$ and n selected from the foregoing preferred groups or values. In other embodiments of the process of the first embodiment, the stabilizing agent of formula (II) has $R^2$, $R^3$ and n selected from the foregoing more preferred groups or values. In particularly preferred embodiments of the process of the first embodiment, the stabilizing agent is a trialkoxy(alkyl)silane (i.e., n is 3 and $R^2$ is alkyl, as described above), with octyl triethoxy silane being especially preferred. According to the process of the first embodiment, the stabilizing agent of formula (II) is added after (C) but prior to (E), i.e., prior to isolating the modified high-cis polybutadiene. The use of a stabilizing agent may be beneficial in producing a modified high-cis polybutadiene polymer which produces improved snow or ice performance in a tire tread which incorporates the modified high-cis polybutadiene polymer. As those of skill in the art will understand, snow or ice performance of a rubber composition upon its incorporation into a tire tread can be predicted by measuring the value of G' at −20° C. for the rubber composition, with higher values indicating preferred performance.

According to the process of the first embodiment, the amount of stabilizing agent that is utilized in the process may vary. In certain embodiments of the first embodiment, the stabilizing agent is used in a molar ratio of 0.01:1 to 10:1 (e.g., 0.01:1, 0.05:1, 0.1:1, 0.5:1, 1:1, 2:1, 3:1, 4:1, 5:1, 6:1, 7:1, 8:1, 9:1, or 10:1), preferably 0.1:1 to 5:1 (e.g., 0.1:1, 0.5:1, 1:1, 1.5:1, 2:1, 2.5:1, 3:1, 3.5:1, 4:1, 4.5:1, or 5:1), more preferably 0.5:1 to 2:1 (e.g., 0.5:1, 0.6:1, 0.7:1, 0.8:1, 0.9:1, 1:1, 1.1:1, 1.2:1, 1.3:1, 1.4:1, 1.5:1, 1.6:1, 1.7:1, 1.8:1, 1.9:1, or 2:1), the molar ratio based upon the moles of stabilizing agent:moles of functionalizing compound.

Quenching Agent

As mentioned above, according to process of the first embodiment, a quenching agent of formula (III) is used in combination with the stabilizing agent of formula (II). According to the process of the first embodiment, formula (III) for the quenching agent is as follows:

$$R^4COOH$$

wherein $R^4$ is selected from H and the group consisting of $C_1$ to $C_{18}$ alkyl, preferably from H and the group consisting of $C_1$ to $C_{10}$ alkyl, more preferably from the group consisting of $C_2$ to $C_7$ alkyl. In certain preferred embodiments of the first embodiment, the quenching agent comprises 2-ethylhexanoic acid or acetic acid, more preferably 2-ethylhexanoic acid; in certain such embodiments, the quenching agent consists of 2-ethylhexanoic acid.

Properties of the Modified High-Cis Polybutadiene Polymer

As mentioned above, the process of the first embodiment results in a modified high-cis polybutadiene polymer having a cis 1,4-bond content of at least 92%, preferably at least 94%; an initial Mooney viscosity $ML_{1+4}$ at 100° C. of 20-100, preferably 30-80 or 40-80, more preferably 40 to 70; and an aged Mooney viscosity $ML_{1+4}$ at 100° C. of no more than 120 (e.g., 120, 110, 100, 90, 80, 70, 60, 50, or less), preferably no more than 105 (e.g., 105, 100, 95, 90, 85, 80, 75, 70, 65, 60, 55, 50, or less). In certain embodiments, the modified high-cis polybutadiene polymer has an aged Mooney viscosity $ML_{1+4}$ at 100° C. of 120 to 50, 120 to 80, 120 to 100, 105 to 50, 105 to 80, or 105 to 100. As also mentioned above, the modified high-cis polybutadiene polymer of the second embodiment has a cis 1,4-bond content of at least 92%, preferably at least 94%; and an initial Mooney viscosity $ML_{1+4}$ at 100° C. of 20-100, preferably 30-80 or 40-80, more preferably 40 to 70. Since the tire of the third embodiment has a component comprising a rubber composition which includes either the modified high-cis polydiene polymer of the second embodiment or a modified high-cis polydiene polymer made by a process according to the first embodiment, the modified high-cis polydiene polymer of the third embodiment can also be understood as having a cis 1,4-bond content of at least 92%, preferably at least 94%; an initial Mooney viscosity $ML_{1+4}$ at 100° C. of 20-100, preferably 30-80 or 40-80, more preferably 40 to 70. By stating that the cis 1,4-bond content is at least 92% is meant that it is 92% or higher (e.g., 92%, 93%, 94%, 95%, 96%, 97%, 98%, 98.5%, 99% or higher) which should be understood to include ranges such as 92-99%, 92-98%, 92-97%, 92-96%, 92-95%, etc. In preferred embodiments of the first-third embodiments, the cis 1,4-bond content of the modified high-cis polybutadiene polymer is at least 94%. By stating that the cis 1,4-bond content is at least 94% is meant that it is 94% or higher (e.g., 94%, 95%, 96%, 97%, 98%, 98.5%, 99% or higher) which should be understood to include ranges such as 94-99%, 94-98%, 94-97%, 94-96%, 94-95%, etc. The cis 1,4-bond contents referred to herein are determined by FTIR (Fourier Transform Infrared Spectroscopy). In particular, a polymer sample is dissolved in $CS_2$ and then subjected to FTIR.

The initial Mooney viscosity $ML_1+_4$ at 100° C. refers to a Mooney viscosity measurement that is taken upon the final modified high-cis polybutadiene polymer (the polymer has been isolated and dried, e.g., by steam distillation) before it is heat aged (as described below). By stating that the initial Mooney viscosity $ML_1+_4$ at 100° C. is 20-100 is meant that it may vary from 20-100 (e.g., 20, 25, 30, 35, 40, 45, 50, 55, 60, 65, 70, 75, 80, 85, 90, 95, or 100). Preferably according to the first-third embodiments, the initial Mooney viscosity $ML_{1+4}$ at 100° C. is from 30 to 80 (e.g., 30, 32, 34, 35, 36, 38, 40, 42, 44, 45, 46, 48, 50, 52, 54, 55, 56, 58, 60, 62, 64, 65, 68, 70, 72, 74, 75, 76, 78, or 80) or 40 to 80, or more preferably 40 to 70. The aged Mooney viscosity $ML_1+_4$ at 100° C. refers to a Mooney viscosity measurement that is taken upon a sample of the high-cis polybutadiene polymer that has been heat aged. More specifically, the polymer sample has been aged at 100° C. for at least 2 days (more preferably 2 days). Generally, the aged Mooney viscosity of the modified high-cis polybutadiene polymer will be somewhat higher than the initial viscosity of the polymer.

According to the first-third embodiments, other properties of the modified high-cis polybutadiene polymer may vary. For example, the polymer may have various Mw, Mn and Mw/Mn values. In certain embodiments of the first-third embodiments, the modified high-cis polybutadiene polymer meets at least one of the following: (a) has a Mw of 150,000 to 2,000,000 grams/mole (e.g., 150,000; 200,000; 250,000; 300,000; 350,000; 400,000; 450,000; 500,000; 600,000; 700,000; 800,000; 900,000; 1,000,000; 1,100,000; 1,200,000; 1,300,000; 1,400,000; 1,500,000; 1,600,000; 1,700,000; 1,800,000; 1,900,000; or 2,000,000 grams/mole), preferably 90,000 to 1,000,000 grams/mole (e.g., 90,000; 150,000; 200,000; 250,000; 300,000; 350,000; 400,000; 450,000; 500,000; 600,000; 700,000; 800,000; 900,000; or 1,000,000 grams/mole), more preferably 250,000 to 750,000 grams/mole (e.g., 250,000; 275,000; 300,000; 325,000; 350,000; 375,000; 400,000; 425,000; 450,000; 475,000; 500,000; 550,000; 600,000; 650,000; 700,000; or 750,000 grams/mole) or 300,000 to 800,000 grams/mole (e.g., 300,000; 325,000; 350,000; 375,000; 400,000; 425,000; 450,000; 475,000; 500,000; 550,000; 600,000; 650,000; 700,000; 750,000; or 800,000; grams/mole); (b) has a Mn of 80,000 to 800,000 grams/mole (e.g., 80,000; 100,000; 120,000; 140,000; 160,000; 180,000; 200,000; 250,000; 300,000; 350,000; 400,000; 450,000; 500,000; 550,000; 600,000; 650,000; 700,000; 750,000; or 800,000 grams/mole), preferably 90,000 to 500,000 grams/mole (e.g., 90,000; 110,000; 130,000; 150,000; 170,000; 190,000; 210,000; 230,000; 250,000; 270,000; 290,000; 310,000; 330,000; 350,000; 370,000; 390,000; 410,000; 430,000; 450,000; 470,000; 490,000; or 500,000 grams/mole), more preferably 100,000 to 350,000 grams/mole (e.g., 100,000; 120,000; 140,000; 160,000; 180,000; 200,000; 250,000; 300,000; or 350,000 grams/mole) or 150,000 to 400,000 grams/mole (e.g., 150,000; 170,000; 190,000; 200,000; 250,000; 300,000; 350,000 or 400,000 grams/mole; (c) has a Mw/Mn of 1.5 to 3.5 (e.g., 1.5, 1.7, 1.9, 2.1, 2.3, 2.5, 2.7, 2.9, 3.1, 3.3, or 3.5), preferably 1.8 to 3 (e.g., 1.8, 2, 2.2, 2.4, 2.6, 2.8, or 3), more preferably 2 to 2.5 (e.g., 2, 2.1, 2.2, 2.3, 2.4, or 2.5); or (d) has an initial Mooney viscosity $ML_1+_4$ at 100° C. of 40 to 80 (e.g., 40, 42, 44, 45, 46, 48, 50, 52, 54, 55, 56, 58, 60, 62, 64, 65, 66, 68, or 70), more preferably 40 to 70. In certain embodiments of the first-third embodiments, the modified high-cis polybutadiene polymer meets each of (a)-(d). In certain embodiments of the first-third embodiments, the modified high-cis polybutadiene polymer satisfies the preferred ranges of each of (a)-(d). In certain embodiments of the first-third embodiments, the modified high-cis polybutadiene polymer satisfies the more preferred ranges of each of (a)-(d). Mn indicates the number average molecular weight in grams/mole (by GPC), Mw indicates the weight average molecular weight in grams/mole (by GPC), and Mw/Mn the molecular weight dispersion or polydispersity of the polymer. Generally, the Mn and Mw of these polymers may be determined by using gel permeation chromatography (GPC) calibrated with polystyrene standards.

The process of the first embodiment may result in (and the polymer of the second embodiment may be and the tire/tire component of the third embodiment may utilize) a polymer which is a modified high-cis polybutadiene polymer product which contains a minor portion of high molecular weight polymer material. Generally, such high molecular weight material may be filtered out, if desired, prior to use of the polymer (e.g., in a rubber composition) or sale of the polymer. The amount of the high molecular weight material will generally be less than about 10%, sometimes less than about 5% by weight. The Mw, Mn and Mw/Mn values that are provided in the preceding paragraph refer to values that can be determined via GPC upon a sample of material made by a process of the first embodiment and/or according to the second or third embodiments and encompass the Mw and Mn values for high molecular weight material that may be filtered out. The Mw and Mn values provided for the working Examples are measured by GPC upon samples that have been filtered to remove high molecular weight material and gel in order to avoid potential damage to the GPC. Also disclosed herein is a polymer product produced by the process of the first embodiment (and a polymer of the second embodiment and a polymer that may be used in the third embodiment) wherein at least 90% by weight, preferably at least 95% by weight or even at least 98% by weight of the polymer in the polymer product has a Mw of 150,000 to 800,000 grams/mole, preferably 250,000 to 600,000 grams/mole, more preferably 300,000 to 500,000 grams/mole and a Mn of 80,000 to 400,000 grams/mole, preferably 90,000 to 300,000 grams/mole, more preferably 150,000 to 300,000 grams/moles.

Tires Having a Component Containing the Modified High-Cis Polybutadiene Polymer

As mentioned above, the modified high-cis polybutadiene produced according to the process of the first embodiment and the modified high-cis polybutadiene of the second embodiment are particularly useful in rubber compositions used for tire components. Accordingly, the third embodiment disclosed herein is directed to a tire having a component comprising a rubber composition comprising a modified high-cis polybutadiene produced according to the process of the first embodiment or a modified high-cis polybutadiene of the second embodiment. Generally, according to the third embodiment, the rubber composition of the tire component comprises: (a) an elastomer component, (b) a reinforcing filler component, (c) a plasticizing component, and (d) a cure package. More specifically, according to the third embodiment, the rubber composition of the tire component comprises: (a) an elastomer component comprising: (i) 10-100 phr of a high-cis modified polybutadiene polymer according to the second embodiment or a high-cis modified polybutadiene polymer resulting from the process of the first embodiment, and (ii) 0-90 phr of at least one additional polymer selected from the group consisting of unmodified polybutadiene, styrene-butadiene, natural rubber, polyisoprene; (b) a reinforcing filler component comprising: (i) 10-200 phr reinforcing silica filler, and (ii) 0-50 phr of reinforcing carbon black filler, wherein the reinforcing carbon black filler is present in an amount of no more than 20% of the weight of reinforcing silica filler; (c) a plasticizing component comprising: (i) 0-50 phr of at least one plasticizing oil, and (ii) 0-60 phr of at least one hydrocarbon resin having a Tg of at least 30° C.; and (d) a cure package.

As mentioned above, according to the third embodiment, the amount of the modified high-cis polybutadiene polymer (a)(i) that is present in the rubber composition may generally vary from 10-100 phr (e.g., 10, 15, 20, 25, 30, 35, 40, 45, 50, 55, 60, 65, 70, 75, 80, 85, 90, 95 or 100 phr). In certain preferred embodiments of the third embodiment, the amount of the modified high-cis polybutadiene polymer (a)(i) that is present in the rubber composition is 20-80 phr (e.g., 20, 25, 30, 35, 40, 45, 50, 55, 60, 65, 70, 75, or 80 phr) or more preferably 30-60 phr (e.g., 30, 35, 40, 45, 50, 55, or 60 phr). Amounts of (a)(i) within the foregoing ranges may also be utilized in the rubber composition of the third embodiment, e.g., 40-80 phr, 50-80 phr, 40-70 phr, 40-60 phr, etc.

Other Rubbers

As also mentioned above, according to the third embodiment, the rubber composition can include 0-90 phr (e.g., 0, 5, 10, 15, 20, 25, 30, 35, 40, 45, 50, 55, 60, 65, 70, 75, 80, 85, or 90 phr) of at least one additional polymer selected from the group consisting of unmodified polybutadiene, styrene-butadiene rubber, natural rubber, polyisoprene, and combinations thereof. In certain preferred embodiments of the third embodiment, the amount of the additional polymer (b)(ii) is 20-80 phr (e.g., 20, 25, 30, 35, 40, 45, 50, 55, 60, 65, 70, 75, or 80 phr) or 40-60 phr (e.g., 40, 45, 50, 55, or 60 phr) such as to constitute a total amount of (a)(i) and (a)(ii) polymers of 100 phr or 100 parts. Amounts of (b)(ii) within the foregoing range may also be utilized in the rubber composition of the third embodiment, e.g., 20-60, 20-50, 30-60, 40-60, etc. In certain embodiments of the third embodiment, the rubber composition includes one or more additional rubbers, i.e., in addition to (a) and (b). In preferred embodiments of the third embodiment, the entire 100 phr of the elastomer component for the rubber composition is comprised of a combination of (a)(i) and (a)(ii). In other words, in such embodiments, no other rubber is present other than the rubbers of (a)(i) and (a)(ii). In certain embodiments of the third embodiment, the rubber composition contains no polyisoprene (i.e., 0 phr of polyisoprene). In certain embodiments of the third embodiment, the rubber composition contains no polybutadiene other a modified high-cis polybutadiene according to (a)(i). In certain embodiments of the third embodiment, the rubber composition contains no natural rubber and no polyisoprene.

Fillers

As discussed above, according to the third embodiment, the rubber composition also includes as a filler component 10-200 phr of reinforcing silica filler (e.g., 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, or 200 phr), and 0-50 phr (e.g., 0, 5, 10, 15, 20, 25, 30, 35, 40, 45, or 50 phr) of reinforcing carbon black filler. In other words, according to the foregoing, the silica filler can be regarded as always being present whereas the carbon black filler is optionally present. In preferred embodiments of the third embodiment, the rubber composition includes reinforcing silica filler in an amount of 30-200 phr (e.g., 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, or 200 phr), more preferably 50-150 phr (e.g., 50, 55, 60, 65, 70, 75, 80, 85, 90, 95, 100, 105, 110, 115, 120, 125, 130, 135, 140, 145, or 150 phr). In preferred embodiments of the third embodiment, the rubber composition includes reinforcing carbon black filler in an amount of 1-20 phr (e.g., 1, 2, 3, 4, 5, 6, 7, 8, 9, 10, 12, 14, 16, 18, or 20 phr), more preferably 1-10 phr (e.g., 1, 2, 3, 4, 5, 6, 7, 8, 9, or 10 phr). In certain embodiments of the third embodiment, the amount of reinforcing silica filler and amount of reinforcing carbon black filler are both within the foregoing preferred amounts. In certain preferred embodiments of the third embodiment, the reinforcing carbon black filler is present in an amount of no more than 20% of the weight of the reinforcing silica filler (e.g., if 100 phr of silica filler were used then the amount of reinforcing carbon black filler would be 20 phr or less), preferably no more than 10% of the weight of reinforcing silica filler; non-limiting examples of foregoing amount of reinforcing carbon black filler include 20 to 1%, 20 to 5%, 15 to 1%, 15 to 5%, 10 to 1%, 10 to 5%, and 5 to 1% by weight of the reinforcing silica filler.

As used herein, the term "reinforcing" with respect to "reinforcing carbon black filler," "reinforcing silica filler," and "reinforcing filler" generally should be understood to encompass both fillers that are traditionally described as reinforcing as well as fillers that may traditionally be described as semi-reinforcing. Traditionally, the term "reinforcing filler" is used to refer to a particulate material that has a nitrogen absorption specific surface area ($N_2SA$) of more than about 100 m$^2$/g, and in certain instances more than 100 m$^2$/g, more than about 125 m$^2$/g, more than 125 m$^2$/g, or even more than about 150 m$^2$/g or more than 150 m$^2$/g. Alternatively (or additionally), the traditional use of the term "reinforcing filler" can also be used to refer to a particulate material that has a particle size of about 10 nm to about 50 nm (including 10 nm to 50 nm). Traditionally, the term "semi-reinforcing filler" is used to refer to a filler that is intermediary in either particle size, surface area ($N_2SA$), or both, to a non-reinforcing filler (as discussed below) and a reinforcing filler. In certain embodiments of the third embodiment disclosed herein, the term "reinforcing filler" is used to refer to a particulate material that has a nitrogen absorption specific surface area ($N_2SA$) of about 20 m$^2$/g or greater, including 20 m$^2$/g or greater, more than about 50 m$^2$/g, more than 50 m$^2$/g, more than about 100 m$^2$/g, more than 100 m$^2$/g, more than about 125 m$^2$/g, and more than 125 m$^2$/g. In certain embodiments of the third embodiment disclosed herein, the term "reinforcing filler" is used to refer to a particulate material that has a particle size of about 10 nm up to about 1000 nm, including 10 nm to 1000 nm, about 10 nm up to about 50 nm and 10 nm to 50 nm.

According to the third embodiment, the particular type or types of carbon black utilized may vary. Generally, suitable carbon blacks for use as a reinforcing filler in the rubber composition of the third embodiment include any of the commonly available, commercially-produced carbon blacks, including those having a surface area of at least about 20 m$^2$/g (including at least 20 m$^2$/g) and, more preferably, at least about 35 m$^2$/g up to about 200 m$^2$/g or higher (including 35 m$^2$/g up to 200 m$^2$/g). Surface area values used herein for carbon blacks are determined by ASTM D-1765 using the cetyltrimethyl-ammonium bromide (CTAB) technique. Among the useful carbon blacks are furnace black, channel blacks, and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. In certain embodiments of the third embodiment, the rubber composition includes a mixture of two or more of the foregoing blacks. Preferably according to the third embodiment, if a carbon black filler is present it consists of only one type (or grade) of reinforcing carbon black. Typical suitable carbon blacks for use in certain embodiments of the third embodiment are N-110, N-220, N-339, N-330, N-351, N-550, and N-660, as designated by ASTM D-1765-82a. The carbon blacks utilized can be in pelletized form or an unpelletized flocculent mass. Preferably, for more uniform mixing, unpelletized carbon black is preferred.

The particular type of reinforcing silica filler utilized in the rubber composition of the third embodiment may vary. Non-limiting examples of reinforcing silica fillers suitable for use in certain embodiments of the third embodiment include, but are not limited to, precipitated amorphous silica, wet silica (hydrated silicic acid), dry silica (anhydrous silicic acid), fumed silica, calcium silicate and the like. Other suitable reinforcing silica fillers for use in certain embodiments of the third embodiment include, but are not limited to, aluminum silicate, magnesium silicate ($Mg_2SiO_4$, $MgSiO_3$ etc.), magnesium calcium silicate ($CaMgSiO_4$), calcium silicate ($Ca_2SiO_4$ etc.), aluminum silicate ($Al_2SiO_5$, $Al_4 \cdot 3SiO_4 \cdot 5H_2O$ etc.), aluminum calcium silicate ($Al_2O_3 \cdot CaO_2SiO_2$, etc.), and the like. Among the listed reinforcing silica fillers, precipitated amorphous wet-process, hydrated silica fillers are preferred. Such reinforcing silica fillers are produced by a chemical reaction in water, from which they are precipitated as ultrafine, spherical particles, with primary particles strongly associated into aggregates, which in turn combine less strongly into agglomerates. The surface area, as measured by the BET method, is a preferred measurement for characterizing the reinforcing character of different reinforcing silica fillers. In certain embodiments of the third embodiment disclosed herein, the rubber composition comprises a reinforcing silica filler having a surface area (as measured by the BET method) of 100 m$^2$/g to 400 m$^2$/g (e.g., 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, or 400 m$^2$/g), 150 m$^2$/g to 350 m$^2$/g, 200 m$^2$/g to 300 m$^2$/g, or 150 m$^2$/g to 250 m$^2$/g.

In certain embodiments of the third embodiment disclosed herein, the rubber composition comprises reinforcing silica filler having a pH of 5.5 to 8 (e.g., 5.5, 5.7, 5.9, 6.1, 6.3, 6.5, 6.7, 6.9, 7.1, 7.3, 7.5, 7.7, 7.9, or 8), 6 to 8 (e.g., 6, 6.2, 6.4, 6.6, 6.8, 7, 7.2, 7.4, 7.6, 7.8, or 8), 6 to 7.5, 6.5 to 8, 6.5 to 7.5, or 5.5 to 6.8. Some of the commercially available reinforcing silica fillers which can be used in certain embodiments of the third embodiment include, but are not limited to, Hi-Sil® EZ120G, Hi-Sil® EZ120G-D, Hi-Sil® 134G, Hi-Sil® EZ 160G, Hi-Sil® EZ 160G-D, Hi-Sil® 190, Hi-Sil® 190G-D, Hi-Sil® EZ 200G, Hi-Sil® EZ 200G-D, Hi-Sil® 210, Hi-Sil® 233, Hi-Sil® 243LD, Hi-Sil® 255CG-D, Hi-Sil® 315-D, Hi-Sil® 315G-D, Hi-Sil® HDP 320G and the like, produced by PPG Industries (Pittsburgh, Pa.) As well, a number of useful commercial grades of different reinforcing silica fillers are also available from Evonik Corporation (e.g., Ultrasil® 320 GR, Ultrasil® 5000 GR, Ultrasil® 5500 GR, Ultrasil® 7000 GR, Ultrasil® VN2 GR, Ultrasil® VN2, Ultrasil® VN3, Ultrasil® VN3 GR, Ultrasil® 7000 GR, Ultrasil® 7005, Ultrasil® 7500 GR, Ultrasil® 7800 GR, Ultrasil® 9500 GR, Ultrasil® 9000 G, Ultrasil® 9100 GR), and Solvay (e.g., Zeosil® 1115MP, Zeosil® 1085GR, Zeosil® 1165MP, Zeosil® 1200MP, Zeosil® Premium, Zeosil® 195HR, Zeosil® 195GR, Zeosil® 185GR, Zeosil® 175GR, and Zeosil® 165 GR).

In certain embodiments of the third embodiment, one or more than one silica coupling agent may also (optionally) be utilized. Silica coupling agents are useful in preventing or reducing aggregation of the silica filler in rubber compositions. Aggregates of the silica filler particles are believed to increase the viscosity of a rubber composition, and, therefore, preventing this aggregation reduces the viscosity and improves the processability and blending of the rubber composition.

Generally, any conventional type of silica coupling agent can be used, such as those having a silane and a constituent component or moiety that can react with a polymer, particularly a vulcanizable polymer. The silica coupling agent acts as a connecting bridge between silica and the polymer. Suitable silica coupling agents for use in certain embodiments of the third embodiment include those containing groups such as alkyl alkoxy, mercapto, blocked mercapto, sulfide-containing (e.g., monosulfide-based alkoxy-containing, disulfide-based alkoxy-containing, tetrasulfide-based alkoxy-containing), amino, vinyl, epoxy, and combinations thereof. In certain embodiments, the silica coupling agent can be added to the rubber composition in the form of a pre-treated silica; a pre-treated silica has been pre-surface treated with a silane prior to being added to the rubber composition. The use of a pre-treated silica can allow for two ingredients (i.e., silica and a silica coupling agent) to be added in one ingredient, which generally tends to make rubber compounding easier.

When a silica coupling agent is utilized in a rubber composition according to the third embodiment, the amount used may vary. In certain embodiments of the third embodiment, the rubber composition does not contain any silica coupling agent. In other embodiments of the third embodiment, the silica coupling agent is present in an amount sufficient to provide a ratio of the total amount of silica coupling agent to silica filler of 0.1:100 to 1:5 (i.e., 0.1 to 20 parts by weight per 100 parts of silica), 1:100 to 1:10, 1:100 to 1:20, and 1:100 to 1:25 as well as about 1:100 to about 0:100 and 1:100 to 0:100. In certain embodiments according to the third embodiment, the tire rubber composition comprises a silica coupling agent in an amount of 0.1 to 15 phr (e.g., 0.1, 0.5, 1, 2, 3, 4, 5, 6, 7, 8, 9, 10, 11, 12, 13, 14, or 15 phr), 0.1 to 12 phr, 0.1 to 10 phr, 0.1 to 5 phr, 1 to 15 phr (e.g., 1, 2, 3, 4, 5, 6, 7, 8, 9, 10, 11, 12, 13, 14, or 15 phr), 1 to 10 phr (e.g., 1, 1.5, 2, 2.5, 3, 3.5, 4, 4.5, 5, 5.5, 6, 6.5, 7, 7.5, 8, 8.5, 9, 9.5, or 10 phr), 1 to 5 phr, or 1 to 3 phr.

Plasticizers

As mentioned above, according to the third embodiment, the rubber composition include a plasticizing component comprising 0-50 phr (e.g., 0, 5, 10, 15, 20, 25, 30, 35, 40, 45, or 50 phr) of at least one plasticizing oil and 0-60 phr (e.g., 0, 5, 10, 15, 20, 25, 30, 35, 40, 45, 50, 55, or 60 phr) of at least one hydrocarbon resin having a Tg of at least 30° C. Preferably, at least one of the plasticizing oil or hydrocarbon resin is present in the rubber composition. In preferred embodiments of the third embodiment, the plasticizing component includes 0-30 phr of plasticizing oil and 5-60 phr of hydrocarbon resin. In more preferred embodiments of the third embodiment, the plasticizing component includes 0-15 phr of plasticizing oil and 5-50 phr of hydrocarbon resin. In certain embodiments of the third embodiment, plasticizing oil is present in an amount of at least 1 phr (e.g., 1-50 phr, 1-30 phr, 1-15 phr, 1-10 phr, 1-5 phr, etc.). In certain embodiments of the third embodiment, the total amount of plasticizing component is no more than 65 phr (e.g., 65, 60, 55, 50, 45, 40, 35, 30, 25, 20, 15, 10, 5 or 1 phr), preferably 5 to 65 phr, more preferably 10 to 55 phr or 15 to 50 phr; in certain such embodiments the hydrocarbon resin comprises at least 50%, at least 60%, at least 70%, 50 to 100%, 50 to 90%, 60 to 100%, 60 to 90%, 70 to 100% or 70 to 90% of the total amount of plasticizing component.

Various types of plasticizing oils may be utilized, including, but not limited to aromatic, naphthenic, and low PCA oils. Preferably, the plasticizing oil is a liquid (pourable) at 25° C. Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Suitable low PCA oils include mild extraction solvates (MES), treated distillate aromatic extracts (TDAE), TRAE, and heavy naphthenics. Suitable MES oils are available commercially as CATENEX SNR from SHELL, PROREX 15, and FLEXON 683 from EXXONMOBIL, VIVATEC 200 from BP, PLAXOLENE MS from TOTAL FINA ELF, TUDALEN 4160/4225 from DAHLEKE, MES-H from REPSOL, MES from Z8, and OLIO MES 5201 from AGIP. Suitable TDAE oils are available as TYREX 20 from EXXONMOBIL, VIVATEC 500, VIVATEC 180, and ENERTHENE 1849 from BP, and EXTENSOIL 1996 from REPSOL. Suitable heavy naphthenic oils are available as SHELLFLEX 794, ERGON BLACK OIL, ERGON H2000, CROSS C2000, CROSS C2400, and SAN JOAQUIN 2000L. Suitable low PCA oils also include various plant-sourced oils such as can be harvested from vegetables, nuts, and seeds. Non-limiting examples include, but are not limited to, soy or soybean oil, sunflower oil (including high oleic sunflower oil having an oleic acid content of at least 60%, at least 70% or at least 80%), safflower oil, corn oil, linseed oil, cotton seed oil, rapeseed oil, cashew oil, sesame oil, *camellia* oil, jojoba oil, macadamia nut oil, coconut oil, and palm oil. In certain embodiments of the third embodiment, the tire rubber composition includes only a limited amount of oil such as less than 10 phr (e.g., 9, 8, 7, 6, 5, 4, 3, 2, 1, or 0 phr), less than 5 phr, 1-5 phr, or even 0 phr.

Various types of hydrocarbon resins may be utilized in the plasticizing component, including plasticizing resins. As used herein, the term plasticizing resin refers to a compound that is solid at room temperature (23° C.) and is miscible in the rubber composition at the amount used which is usually at least 5 phr. Generally, the plasticizing resin will act as a diluting agent and can be contrasted with tackifying resins which are generally immiscible and may migrate to the surface of a rubber composition providing tack. In certain embodiments of the third embodiment, wherein a plasticizing resin is utilized, it comprises a hydrocarbon resin and may be aliphatic type, aromatic type or aliphatic/aromatic type depending on the monomers contained therein. Examples of suitable plasticizing resins for use in the rubber compositions of the third embodiment include, but are not limited to, cyclopentadiene (abbreviated to CPD) or dicyclopentadiene (abbreviated to DCPD) homopolymer or copolymer resins, terpene homopolymer or copolymer resins and C5 fraction homopolymer or copolymer resins. Such resins may be used, for example, individually or in combination. In certain embodiments of the third embodiment, a plasticizing resin is used which meets at least one of the following: a Tg greater than 30° C. (preferably greater than 40° C. and/or no more than 120° C. or no more than 100° C.), a number average molecular weight (Mn) of between 400 and 2000 grams/mole (preferably 500-2000 grams/mole), and a polydispersity index (PI) of less than 3 (preferably less than 2), wherein PI=Mvv/Mn and Mvv is the weight-average molecular weight of the resin. Tg of the resin can be measured by DSC (Differential Scanning calorimetry) according to ASTM D3418 (1999). Mw, Mn and PI of the resin may be determined by size exclusion chromatography (SEC), using THF, 35° C.; concentration 1 g/1; flow rate 1 milliliters/min; solution filtered through a filter with a porosity of 0.45 µm before injection; Moore calibration with polystyrene standards; set of 3 "Waters" columns in series ("Styragel" HR4E, HR1 and HR0.5); detection by differential refractometer ("Waters 2410") and its associated operating software ("Waters Empower").

Cure Package

As mentioned above, according to the third embodiment, the rubber composition includes a cure package. Generally, a cure package will include at least one of: a vulcanizing agent; a vulcanizing accelerator; a vulcanizing activator (e.g., zinc oxide, stearic acid, and the like); a vulcanizing inhibitor; and an anti-scorching agent. In certain embodiments, the cure package includes at least one vulcanizing agent, at least one vulcanizing accelerator, at least one vulcanizing activator and optionally a vulcanizing inhibitor and/or an anti-scorching agent. Vulcanizing accelerators and vulcanizing activators act as catalysts for the vulcanization agent. Various vulcanizing inhibitors and anti-scorching agents are known in the art and can be selected by one skilled in the art based on the vulcanizate properties desired.

Examples of suitable types of vulcanizing agents for use in certain embodiments of the third embodiment, include but are not limited to, sulfur or peroxide-based curing components. Examples of specific suitable sulfur vulcanizing agents include "rubbermaker's" soluble sulfur; sulfur donating curing agents, such as an amine disulfide, polymeric polysulfide, or sulfur olefin adducts; and insoluble polymeric sulfur. Preferably, the sulfur vulcanizing agent is soluble sulfur or a mixture of soluble and insoluble polymeric sulfur. Generally, the vulcanizing agents may be used in an amount ranging from 0.1 to 10 phr, including from 1 to 7.5 phr, including from 1 to 5 phr, and preferably from 1 to 3.5 phr.

Vulcanizing accelerators are used to control the time and/or temperature required for vulcanization and to improve properties of the vulcanizate. Examples of suitable vulcanizing accelerators include, but are not limited to, thiazole vulcanization accelerators, such as 2-mercaptobenzothiazole, 2,2'-dithiobis(benzothiazole) (MBTS), N-cyclohexyl-2-benzothiazole-sulfenamide (CBS), N-tert-butyl-2-benzothiazole-sulfenamide (TBBS), and the like; guanidine vulcanization accelerators, such as diphenyl guanidine (DPG) and the like; thiuram vulcanizing accelerators; carbamate vulcanizing accelerators; and the like. Generally, the amount of the vulcanization accelerator used ranges from 0.1 to 10 phr (e.g., 0.1, 0.5, 1, 2, 3, 4, 5, 6, 7, 8, 9, or 10 phr), preferably 0.5 to 5 phr (e.g., 0.5, 1, 1.5, 2, 2.5, 3, 3.5, 4, 4.5 or 5 phr).

Vulcanizing activators are additives used to support vulcanization. Generally vulcanizing activators include both an inorganic and organic component. Zinc oxide is the most widely used inorganic vulcanization activator. Various organic vulcanization activators are commonly used including stearic acid, palmitic acid, lauric acid, and zinc salts of each of the foregoing. Generally, the amount of vulcanization activator used ranges from 0.1 to 6 phr (e.g., 0.1, 0.5, 1, 1.5, 2, 2.5, 3, 3.5, 4, 4.5, 5, 5.5, or 6 phr), preferably 0.5 to 4 phr (e.g., 0.5, 1, 1.5, 2, 2.5, 3 3.5, or 4 phr).

Vulcanization inhibitors are used to control the vulcanization process and generally retard or inhibit vulcanization until the desired time and/or temperature is reached. Common vulcanization inhibitors include, but are not limited to, PVI (cyclohexylthiophthalmide) from Santogard. Generally, the amount of vulcanization inhibitor used is 0.1 to 3 phr (e.g., 0.1, 0.5, 1, 1.5, 2, 2.5, or 3 phr), preferably 0.5 to 2 phr (e.g., 0.5, 1, 1.5, or 2 phr).

Other Ingredients

Various other ingredients that may optionally be added to the tire rubber compositions of the third embodiment disclosed herein include waxes, processing aids, tackifying resins, reinforcing resins, and peptizers, and antioxidants.

Methods for Preparing Rubber Compositions

Rubber compositions according to the third embodiment disclosed herein may generally be formed by mixing together the ingredients for the rubber composition (as disclosed above) by methods known in the art, such as, for example, by kneading the ingredients together in a Banbury mixer or on a milled roll. These methods generally include at least one non-productive master-batch mixing stage and a final productive mixing stage. The term non-productive master-batch stage is known to those of skill in the art and generally understood to be a mixing stage where no vulcanizing agents or vulcanization accelerators are added. The term final productive mixing stage is also known to those of skill in the art and generally understood to be the mixing stage where the vulcanizing agents and vulcanization accelerators are added into the rubber composition. In certain embodiments of the third embodiment, one non-productive master-batch mixing stage may be used in preparing the rubber composition. In certain embodiments of the third embodiment, more than one non-productive master-batch mixing stage is used. In certain embodiments of the third embodiment where silica and silica coupler is utilized, more than one non-productive master-batch mixing stage is used and at least a portion of the silica filler is added in a second non-productive master-batch mixing stage (also described as a re-mill stage); in certain such embodiments, all silica coupling agent is added only in the second non-productive master-batch mixing stage (along with at least a portion of the silica filler) and no silica coupling agent is added in an initial non-productive master-batch mixing stage.

In certain embodiments of third embodiment, the master-batch mixing stage includes at least one of tandem mixing or intermeshing mixing. Tandem mixing can be understood as including the use of a mixer with two mixing chambers with each chamber having a set of mixing rotors; generally, the two mixing chambers are stacked together with the upper mixing being the primary mixer and the lower mixer accepting a batch from the upper or primary mixer. In certain embodiments, the primary mixer utilizes intermeshing rotors and in other embodiments the primary mixer utilizes tangential rotors. Preferably, the lower mixer utilizes intermeshing rotors. Intermeshing mixing can be understood as including the use of a mixer with intermeshing rotors. Intermeshing rotors refers to a set of rotors where the major diameter of one rotor in a set interacts with the minor diameter of the opposing rotor in the set such that the rotors intermesh with each other. Intermeshing rotors must be driven at an even speed because of the interaction between the rotors. In contrast to intermeshing rotors, tangential rotors refers to a set of rotors where each rotor turns independently of the other in a cavity that may be referred to as a side. Generally, a mixer with tangential rotors will include a ram whereas a ram is not necessary in a mixer with intermeshing rotors.

In certain embodiments of the third embodiment, the rubber composition is prepared by a process with the non-productive master batch mixing stage(s) conducted at a temperature of about 130° C. to about 200° C. In certain embodiments of the third embodiment, the rubber composition is prepared by a process with the final productive mixing stage conducted at a temperature below the vulcanization temperature in order to avoid unwanted pre-cure of the rubber composition. Therefore, the temperature of the productive mixing stage should not exceed about 120° C. and is typically about 40° C. to about 120° C., or about 60° C. to about 110° C. and, especially, about 75° C. to about 100° C.

Examples

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments. It should specifically be understood that modified high-cis polybutadiene polymers can be made using different functional compounds (i.e., according to formula (I), as discussed above), using different stabilizing agents or no stabilizing agent (as discussed above), or using/having different combinations of the functional compound and stabilizing and used in rubber compositions. It should also be understood that the high-cis polybutadiene polymers can be utilized in rubber compositions along with ingredients (e.g., additional rubber(s), fillers, cure package ingredients) that differ in relative amount, composition, or both from those used in the examples (i.e., as fully as disclosed in the preceding paragraphs).

Example 1 (Use of CPTEOS with Nd/MAO catalyst): To a 2-gallon nitrogen purged reactor equipped with turbine agitator blades was added 1209 grams of hexane and 3257 grams of 19.5 weight % 1,3-butadiene in hexane. A preformed catalyst was prepared by mixing 9.55 milliliters of 4.32 Molar methylaluminoxane (MAO) in toluene, 2.03 grams of 22.0 weight % 1,3-butadiene in hexane, 0.77 milliliters of 0.537 Molar neodymium versatate in cyclohexane, 10.32 milliliters of 1.0 Molar diisobutylaluminum hydride in hexane, and 1.65 milliliters diethylaluminum chloride in hexane. The catalyst was aged for 15 minutes and then charged into the reactor (which already contained the solvent and 1,3-butadiene in hexane). The reactor jacket temperature was then set to 65° C. After 60 minutes of polymerization time, 1.91 milliliters of 4.15 Molar (3-cyanopropyl)triethoxysilane (CPTEOS, molar ratio of 25:1 based on moles of functionalizing compound:moles of Nd in catalyst) diluted with approximately 20 milliliters of hexanes was charged into the reactor. After 30 minutes, the polymerization mixture was cooled to room temperature (approximately 25° C.).

Approximately 400 grams of the resulting modified polymer cement (approximately 4500 grams were obtained in total) were transferred (in approximately equal portions) to five bottles (labeled as a-e). Octyltriethoxysilane (OTES, 3.18 Molar (neat)) and ethylhexanoic acid (EHA, 6.3 Molar (neat)) were then added to bottles b-e in the amounts indicated below in Table 1. No OTES or EHA was added to bottle a, and this example is considered to be a control. Each bottle was tumbled for 30 minutes in a water bath maintained at 65° C. The resulting polymer cement in each bottle was quenched with 3 milliliters of 12 weight % 2,6-di-tert-butyl-4-methylphenol (BHT) solution in isopropanol, coagulated in additional isopropanol containing BHT, and drum dried. The unaged and aged Mooney viscosity $ML_{1+4}$ values are summarized below in Table 1 with the aged values being determined upon samples that were aged by placement in a 100° C. oven for 2 days.

TABLE 1

| | 1a | 1b | 1c | 1d | 1e |
|---|---|---|---|---|---|
| OTES[1] | 0, 0 | 0.22, 1 | 1.10, 5 | 2.20, 10 | 4.40, 20 |
| EHA[2] | 0, 0 | 0.056, 0.5 | 0.28, 0.5 | 0.56, 0.5 | 1.11, 0.5 |
| Unaged Mooney | 81 | 72 | 45 | 38 | 36 |
| Aged Mooney | 123 | 112 | 105 | 116 | 120 |

[1]The first number is the amount in milliliters and the second number is a molar ratio based upon the moles of the stabilizing agent:moles of functionalizing compound (e.g., 1 indicates a ratio of 1:1).
[2]The first number is the amount in milliliters and the second number is a molar ratio based upon the moles of the quenching agent:moles of stabilizing agent.

As can be seen from the data of Table 1, the use of a stabilizing agent and quenching agent in combination with a functionalizing compound (i.e., CPTEOS) produces modified high-cis polybutadienes having an unaged Mooney Viscosity $ML_{1+4}$ of less than 80 which polymers also have an aged $ML_{1+4}$ of no more than 120. In contrast, the control example (1a) which uses no stabilizing agent and no quenching agent results in a modified high-cis polybutadiene with an aged $ML_{1+4}$ of more than 120 (i.e., 123).

Example 2 (Use of CPTEOS with COMCAT catalyst): To a 2-gallon nitrogen purged reactor equipped with turbine agitator blades was added 1209 grams of hexane and 3257 grams of 19.5 weight % 1,3-butadiene in hexane. Next, 3.13 milliliters of 1.0 Molar diisobutylaluminum hydride in hexane followed by 2.39 milliliters of 0.452 Molar COMCAT catalyst (a Nd—FC/SF catalyst, available from Comar Chemical Ltd.) were charged to the reactor. The reactor jacket temperature was then set to 65° C. After 60 minutes of polymerization time, 6.50 milliliters of 4.15 Molar (3-cyanopropyl)triethoxysilane (CPTEOS, molar ratio of 25:1 based on moles of functionalizing compound:moles of Nd in catalyst) diluted with approximately 20 milliliters of hexanes was charged into the reactor. After 30 minutes, the polymerization mixture was cooled to room temperature (approximately 25° C.).

Approximately 400 grams of the resulting modified polymer cement were transferred (in approximately equal portions) to five bottles (labeled as a-e). Octyltriethoxysilane (OTES, 3.18 Molar (neat)) and ethylhexanoic acid (EHA, 6.3 Molar (neat)) were then added to bottles b-e in the amounts indicated below in Table 2. No OTES or EHA was added to bottle a, and this example is considered to be a control. Each bottle was tumbled for 30 minutes in a water bath maintained at 65° C. The resulting polymer cement in each bottle was quenched with 3 milliliters of 12 weight % 2,6-di-tert-butyl-4-methylphenol (BHT) solution in isopropanol, coagulated in additional isopropanol containing BHT, and drum dried. The unaged and aged Mooney viscosity $ML_{1+4}$ values are summarized below in Table 2 with the aged values being determined upon samples that were aged by placement in a 100° C. oven for 2 days.

TABLE 2

|  | 2a | 2b | 2c | 2d | 2e |
|---|---|---|---|---|---|
| OTES[1] | 0, 0 | 0.75, 1 | 3.74, 5 | 7.48, 10 | 14.97, 20 |
| EHA[2] | 0, 0 | 0.14, 0.5 | 0.71, 0.5 | 1.41, 0.5 | 2.83, 0.5 |
| Unaged Mooney | 73 | 51 | 47 | 40 | 67 |
| Aged Mooney | 140 | 94 | 96 | 94 | 67 |

[1]The first number is the amount in milliliters and the second number is a molar ratio based upon the moles of the stabilizing agent:moles of functionalizing compound.
[2]The first number is the amount in milliliters and the second number is a molar ratio based upon the moles of the quenching agent:moles of stabilizing agent.

As can be seen from the data of Table 2, the use of a stabilizing agent and quenching agent in combination with a functionalizing compound (i.e., CPTEOS) produces a modified high-cis polybutadiene having an unaged Mooney $ML_{1+4}$ of less than 70 which polymers also have an aged $ML_{1+4}$ of less than 100. In contrast, the control example (2a) which uses no stabilizing agent and no quenching agent results in a modified high-cis polybutadiene with an aged $ML_{1+4}$ of more than 120 (i.e., 140).

Example 3 (Use of CPTEOS with Nd/MAO catalyst: To a 2-gallon nitrogen purged reactor equipped with turbine agitator blades was added 1209 grams of hexane and 3257 grams of 19.5 weight % 1,3-butadiene in hexane. A preformed catalyst was prepared by mixing 9.55 milliliters of 4.32 Molar methylaluminoxane (MAO) in toluene, 2.03 grams of 22.0 weight % 1,3-butadiene in hexane, 0.77 milliliters of 0.537 Molar neodymium versatate in cyclohexane, 10.32 milliliters of 1.0 Molar diisobutylaluminum hydride in hexane, and 1.65 milliliters diethylaluminum chloride in hexane. The catalyst was aged for 15 minutes and then charged into the reactor (which already contained the hexane and 1,3-butadiene in hexane. The reactor jacket temperature was then set to 65° C. After 60 minutes of polymerization time, 1.91 milliliters of 4.15 Molar (3-cyanopropyl)triethoxysilane (CPTEOS, molar ratio of 25:1 based on moles of functionalizing compound:moles of Nd in catalyst) diluted with approximately 20 milliliters of hexanes was charged into the reactor. After 30 minutes, 2.50 milliliters of octyltriethoxysilane (OTES, 3.18 Molar (neat)), molar ratio of 1:1 based on moles of stabilizing agent:moles of functionalizing compound) and 0.63 milliliters of ethylhexanoic acid (EHA, 6.3 Molar (neat)), molar ratio of 0.5:1 based on moles of quenching agent:moles of stabilizing agent) were charged to the reactor and allowed to react while the reactor cooled to room temperature (approximately 25° C.).

The resulting polymer cement (approximately 400 grams) was coagulated in a bucket of isopropanol containing BHT and drum dried. The unaged and aged Mooney $ML_{1+4}$ value for the modified high-cis polybutadiene are summarized below in Table 3 with the aged values being determined upon samples that were aged by placement in a 100° C. oven for 2 days. As a control, a sample of the polymer that was not treated with any OTES or EHA was also subjected to the same aging and the aged Mooney $ML_{1+4}$ value is indicated below as Aged Control Mooney.

TABLE 3

| OTES[1] | 2.50, 1 |
|---|---|
| EHA[2] | 0.63, 0.5 |
| Unaged Mooney | 80 |
| Aged Mooney | 97 |
| Aged Control Mooney | 125 |

[1]The first number is the amount in milliliters and the second number is a molar ratio based upon the moles of the stabilizing agent:moles of functionalizing compound.
[2]The first number is the amount in milliliters and the second number is a molar ratio based upon the moles of the quenching agent:moles of stabilizing agent.

As can be seen from the data of Table 3, the modified high-cis polybutadiene produced in Example 3 had an unaged Mooney viscosity $ML_{1+4}$ of less than 100 (more specifically 80) and an aged Mooney viscosity $ML_{1+4}$ that was also less than 100 (more specifically 97).

Example 4 (Use of CPTEOS with COMCAT catalyst): To a 2-gallon nitrogen purged reactor equipped with turbine agitator blades was added 1209 grams of hexane and 3257 grams of 19.5 weight % 1,3-butadiene in hexane. Next, 3.13 milliliters of 1.0 Molar diisobutylaluminum hydride in hexane and 2.39 milliliters of 0.452 Molar COMCAT catalyst (a Nd—FC/SF catalyst, available from Comar Chemical Ltd.) were charged to the reactor. The reactor jacket temperature was then set to 65° C. After 60 minutes of polymerization time, 6.50 milliliters of 4.15 Molar (3-cyanopropyl)triethoxysilane (CPTEOS, molar ratio of 25:1 based on moles of functionalizing compound:moles of Nd in catalyst) diluted with approximately 20 milliliters of hexanes was charged into the reactor.

After 30 minutes, 8.49 milliliters of octyltriethoxysilane (OTES, 3.18 Molar (neat)), molar ratio of 1:1 based on moles of stabilizing agent:moles of functionalizing compound) and 2.14 milliliters of ethylhexanoic acid (EHA, 6.3 Molar (neat)), molar ratio of 0.5:1 based on moles of quenching agent:moles of stabilizing agent) were charged to the reactor and allowed to react while the reactor cooled to room temperature (approximately 25° C.).

The resulting polymer cement (approximately 400 grams) was coagulated in a bucket of isopropanol containing BHT and drum dried. The unaged and aged Mooney $ML_1+_4$ value for the modified high-cis polybutadiene are summarized below in Table 4 with the aged values being determined upon samples that were aged by placement in a 100° C. oven for 2 days. As a control, a sample of the polymer that was not treated with any OTES or EHA was also subjected to the same aging and the aged Mooney $ML_{1+4}$ value is indicated below as Aged Control Mooney.

TABLE 4

| OTES[1] | 8.49, 1 |
|---|---|
| EHA[2] | 2.14, 0.5 |
| Unaged Mooney | 52 |
| Aged Mooney | 95 |
| Aged Control Mooney | 142 |

[1]The first number is the amount in milliliters and the second number is a molar ratio based upon the moles of the stabilizing agent:moles of functionalizing compound.
[2]The first number is the amount in milliliters and the second number is a molar ratio based upon the moles of the quenching agent:moles of stabilizing agent.

As can be seen from the data of Table 4, the modified high-cis polybutadiene produced in Example 4 had an unaged Mooney viscosity $ML_{1+4}$ of less than 100 (more specifically 52) and an aged Mooney viscosity $ML_{1+4}$ that was also less than 100 (more specifically 97).

Example 5 (Use of CETEOS with Nd/MAO catalyst): Example 3 was repeated except that instead of using CPTEOS, 1.76 milliliters of 4.5 Molar (2-cyanoethyl)triethoxysilane (CETEOS, molar ratio of 25:1 based on moles of functionalizing compound:moles of Nd in catalyst) was used. The results are listed below in Table 5.

Example 6 (Use of CETEOS with COMCAT catalyst): Example 4 was repeated except that instead of using CPTEOS, 6.00 milliliters of 4.5 Molar (2-cyanoethyl)triethoxysilane (CETEOS, molar ratio of 25:1 based on moles of functionalizing compound:moles of Nd in catalyst) was used. The results are listed below in Table 5.

TABLE 5

|  | Ex. 5 | Ex. 6 |
|---|---|---|
| OTES[1] | 2.50, 1 | 8.49, 1 |
| EHA[2] | 0.63, 0.5 | 2.14, 0.5 |
| Unaged Mooney | 94 | 83 |
| Aged Mooney | 112 | 99 |
| Aged Control Mooney | 134 | 122 |

As can be seen from the data of Table 5, both of the modified high-cis polybutadienes produced had an unaged Mooney viscosity $ML_{1+4}$ of less than 100 (more specifically 94 and 83) and an aged Mooney viscosity $ML_{1+4}$ that was less than 120 (more specifically 112 and 99).

This application discloses several numerical range limitations that support any range within the disclosed numerical ranges, even though a precise range limitation is not stated verbatim in the specification, because the embodiments of the compositions and methods disclosed herein could be practiced throughout the disclosed numerical ranges. With respect to the use of substantially any plural or singular terms herein, those having skill in the art can translate from the plural to the singular or from the singular to the plural as is appropriate to the context or application. The various singular or plural permutations may be expressly set forth herein for sake of clarity.

It will be understood by those within the art that, in general, terms used herein, and especially in the appended claims are generally intended as "open" terms. For example, the term "including" should be interpreted as "including but not limited to," the term "having" should be interpreted as "having at least," the term "includes" should be interpreted as "includes but is not limited to." It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." All references, including but not limited to patents, patent applications, and non-patent literature are hereby incorporated by reference herein in their entirety. While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A modified high-cis polybutadiene polymer having polymer chains bonded to a residue of a functionalizing compound having formula (I) as follows

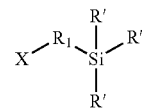

where X is a cyano group, $R^1$ is independently selected from hydrocarbylene of $C_1$-$C_{20}$ optionally containing one unsaturated carbon-carbon bond, each R' is independently selected from alkoxy of $C_1$-$C_{20}$, and wherein each polymer chain is bonded to the residue of the functionalizing compound through the X group, and the polymer has a cis 1,4-bond content of 92-98%, an initial Mooney viscosity $ML_{1+4}$ at 100° C. of 20-100, and an aged Mooney viscosity $ML_{1+4}$ at 100° C. of no more than 120, as determined after aging at 100° C. for 2 days.

2. The high-cis modified polybutadiene polymer of claim 1, wherein the cis 1,4-bond content is at least 94%.

3. The high-cis modified polybutadiene polymer of claim 1, meeting at least one of the following:

a. has a Mw of 150,000 to 2,000,000 grams/mole;

b. has a Mn of 80,000 to 800,000 grams/mole;

C. has a Mw/Mn of 1.5 to 4; or d. has an initial Mooney viscosity $ML_{1+4}$ at 100° C. of 40 to 70.

4. The high-cis modified polybutadiene polymer of claim 3, wherein each of (a)-(d) is met.

5. A process for preparing the modified high-cis polybutadiene polymer of claim 1, the process comprising
A. providing a catalyst system comprising
   a. a lanthanide-based catalyst system comprising (i) a lanthanide compound, (ii) an alkylating agent, and (iii) a halogen source, where (iii) may optionally be provided by (i), (ii), or both (i) and (ii),
   b. a nickel-based catalyst system comprising (i) a nickel compound, optionally in combination with an alcohol, (ii) an organoaluminum, organomagnesium, organozinc compound, or a combination thereof, and (iii) a fluorine-containing compound or a complex thereof, or
   c. a cobalt-based catalyst system, comprising (i) a cobalt compound, (ii) an organo aluminum halide, and (iii) optionally water;
B. using the catalyst system of (A) to polymerize 1,3-butadiene to produce polymer chains with a living end,
C. reacting the living end polymer chains from (B) with a functionalizing compound having formula (I) as follows

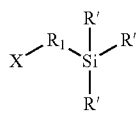

where X is a cyano group,
$R^1$ is independently selected from hydrocarbylene of $C_1$-$C_{20}$, optionally containing one unsaturated carbon-carbon bond,
each R' is independently selected from alkoxy of $C_1$-$C_{20}$, and
thereby producing a modified high-cis polybutadiene,
D. reacting the modified high-cis polybutadiene from (C) with
   (1) a stabilizing agent of formula (II) as follows $R^2_n Si(OR^3)_{4-n}$ wherein $R^2$ is selected from the group consisting of $C_1$ to $C_{20}$ alkyl, $C_4$ to $C_{10}$ cycloalkyl, or $C_5$ to $C_{20}$ aromatic groups,
wherein $R^3$ may be the same as or different from $R^2$ and is selected from $C_1$ to $C_{20}$ alkyl, $C_4$ to $C_{10}$ cycloalkyl, or $C_5$ to $C_{20}$ aromatic groups, and n is an integer of 1 to 3, and
   (2) a quenching agent of formula (III) as follows $R^4 COOH$ wherein $R^4$ is selected from H and the group consisting of $C_1$ to $C_{18}$ alkyl, and
E. isolating the modified high-cis polybutadiene of (D), to produce the modified high-cis polybutadiene of claim 1.

6. The process of claim 5, wherein the modified high-cis polybutadiene has a cis 1,4-bond content of at least 94%.

7. The process of claim 5, wherein the isolated modified high-cis polybutadiene has an initial Mooney viscosity $ML_{1+4}$ at 100° C. of 30-80.

8. The process of claim 5, wherein the isolated modified high-cis polybutadiene has an aged Mooney viscosity $ML_{1+4}$ at 100° C. of no more than 105.

9. The process of claim 5, wherein the functionalizing compound of formula (I) is used in a molar ratio of 100:1 to 0.5:1, the molar ratio based upon the moles of functionalizing compound: moles of primary metal of the catalyst system.

10. The process of claim 5, wherein the stabilizing agent of formula (II) is used in a molar ratio of 0.1:1 to 50:1, the molar ratio based upon the moles of stabilizing agent: moles of functionalizing compound.

11. The process of claim 5, wherein the quenching agent of formula (III) is used in a molar ratio of 0.1:1 to 10:1, the molar ratio based upon the moles of quenching agent: moles of stabilizing agent of formula (II).

12. The process of claim 5, wherein the stabilizing agent of formula (II) comprises octyltriethoxysilane.

13. The process of claim 5, wherein the quenching agent of formula (III) comprises 2-ethylhexanoic acid.

14. The process of claim 5, wherein the catalyst system is a lanthanide-based catalyst system (a).

15. The process of claim 5, wherein the modified high-cis polybutadiene meets at least one of the following:
   a. has a Mw of 150,000 to 2,000,000 grams/mole;
   b. has a Mn of 80,000 to 800,000 grams/mole;
   c. has a Mw/Mn of 1.5 to 4; or
   d. has an initial Mooney viscosity $ML_{1+4}$ at 100° C. of 40 to 80.

16. The process of claim 15, wherein each of (a)-(d) is met.

* * * * *